United States Patent
Nei et al.

(10) Patent No.: US 12,423,795 B2
(45) Date of Patent: Sep. 23, 2025

(54) VEHICLE SELF-INSPECTION APPARATUS AND METHOD

(71) Applicant: OPENLANE, Inc., Carmel, IN (US)

(72) Inventors: Scott Nei, Carmel, IN (US); William Doyle, Fishers, IN (US); Michelle Kaiser Bray, Carmel, IN (US)

(73) Assignee: OPENLANE, Inc., Carmel, IN (US)

( * ) Notice: Subject to any disclaimer, the term of this patent is extended or adjusted under 35 U.S.C. 154(b) by 0 days.

(21) Appl. No.: 18/230,796

(22) Filed: Aug. 7, 2023

(65) Prior Publication Data
US 2023/0410282 A1  Dec. 21, 2023

Related U.S. Application Data

(63) Continuation of application No. 17/027,283, filed on Sep. 21, 2020, now Pat. No. 11,721,010.

(Continued)

(51) Int. Cl.
*G06K 9/00* (2022.01)
*G06Q 10/20* (2023.01)
(Continued)

(52) U.S. Cl.
CPC .......... *G06T 7/0004* (2013.01); *G06Q 10/20* (2013.01); *G06Q 30/0283* (2013.01);
(Continued)

(58) Field of Classification Search
CPC . G06T 2207/30108; G06T 2207/30248; G06T 2207/30252; G06T 2207/30268
See application file for complete search history.

(56) References Cited

U.S. PATENT DOCUMENTS

| | | |
|---|---|---|
| 8,712,893 B1 | 4/2014 | Brandmaier |
| 9,002,719 B2 | 4/2015 | Tofte |

(Continued)

FOREIGN PATENT DOCUMENTS

| | | |
|---|---|---|
| CN | 1967565 A | 5/2007 |
| EP | 0982673 A2 | 3/2000 |

(Continued)

OTHER PUBLICATIONS

Abulkhair, Maysoon, et al. "Car inspection system." Procedia Manufacturing 3 (2015): 3128-3135. (Year: 2015).*

(Continued)

*Primary Examiner* — Avinash Yentrapati
(74) *Attorney, Agent, or Firm* — Lempia Summerfield Katz LLC

(57) ABSTRACT

A system and method for self-inspection of a vehicle is disclosed. The self-inspection may be performed by an application executed on a mobile device, with the application being configured to determine excessive wear and use. The mobile device may obtain images from a plurality of predetermined views of the vehicle, with damage input being determined for the plurality of predetermined views. In turn, a cost estimate may be output for repair or replacement due to the damage for each of the plurality of predetermined views as well as a total cost for repair or replacement, which may be dynamically updated as additional damage is input for the plurality of predetermined views.

23 Claims, 22 Drawing Sheets

Related U.S. Application Data

(60) Provisional application No. 62/903,930, filed on Sep. 22, 2019.

(51) Int. Cl.
 *G06Q 30/0283* (2023.01)
 *G06T 7/00* (2017.01)

(52) U.S. Cl.
 CPC ............... *G06T 2200/24* (2013.01); *G06T 2207/30108* (2013.01); *G06T 2207/30252* (2013.01)

(56) References Cited

U.S. PATENT DOCUMENTS

| | | | |
|---|---|---|---|
| 9,189,960 | B2 | 11/2015 | Couch |
| 9,218,698 | B2 | 12/2015 | Ricci |
| 9,604,563 | B1* | 3/2017 | Wilson, II ............ G06Q 40/08 |
| 9,824,453 | B1 | 11/2017 | Collins |
| 9,886,771 | B1 | 2/2018 | Chen |
| 10,089,396 | B2 | 10/2018 | Endras |
| 10,510,142 | B1* | 12/2019 | Dohner ............. G06Q 30/0206 |
| 10,692,050 | B2 | 6/2020 | Taliwal |
| 10,762,385 | B1* | 9/2020 | Yang ..................... G06V 10/82 |
| 10,789,786 | B2 | 9/2020 | Zhang |
| 2003/0036964 | A1 | 2/2003 | Boyden |
| 2003/0200151 | A1 | 10/2003 | Ellenson |
| 2004/0142678 | A1 | 7/2004 | Krasner |
| 2005/0108065 | A1* | 5/2005 | Dorfstatter ............ G06Q 40/08 705/4 |
| 2006/0132291 | A1* | 6/2006 | Dourney, Jr. ......... G06Q 99/00 348/148 |
| 2008/0052134 | A1 | 2/2008 | Nowak |
| 2008/0306996 | A1 | 12/2008 | Mcclellan |
| 2012/0239530 | A1 | 9/2012 | Varadarajan |
| 2012/0297337 | A1 | 11/2012 | St. Denis |
| 2013/0038701 | A1 | 2/2013 | Hung |
| 2013/0201354 | A1 | 8/2013 | Lascolea |
| 2014/0100889 | A1* | 4/2014 | Tofte ..................... G06Q 10/20 705/4 |
| 2014/0104379 | A1* | 4/2014 | Glasgow ................ H04N 23/64 348/211.3 |
| 2014/0201022 | A1 | 7/2014 | Balzer |
| 2014/0277916 | A1 | 9/2014 | Mullen |
| 2014/0316825 | A1 | 10/2014 | Van Dijk |
| 2015/0025993 | A1 | 1/2015 | Kiglies |
| 2015/0264255 | A1 | 9/2015 | Budihal |
| 2015/0287130 | A1* | 10/2015 | Vercollone ........... G06V 10/235 705/34 |
| 2016/0012539 | A1 | 1/2016 | Gorelov |
| 2016/0034590 | A1* | 2/2016 | Endras ................... G06Q 30/08 707/770 |
| 2016/0140778 | A1* | 5/2016 | Bailly ..................... G06T 7/70 348/148 |
| 2017/0061545 | A1* | 3/2017 | Siddall ................. G06F 3/0484 |
| 2017/0148102 | A1 | 5/2017 | Franke |
| 2017/0267192 | A1* | 9/2017 | Chen ..................... G07C 5/085 |
| 2017/0293894 | A1* | 10/2017 | Taliwal ................ G06V 10/82 |
| 2018/0012350 | A1 | 1/2018 | Gangitano |
| 2018/0260793 | A1* | 9/2018 | Li .......................... G06Q 40/08 |
| 2018/0293552 | A1* | 10/2018 | Zhang ................... G06V 10/25 |
| 2018/0293806 | A1 | 10/2018 | Zhang |
| 2019/0012394 | A1 | 1/2019 | Endras |
| 2019/0064836 | A1 | 2/2019 | Buttolo |
| 2019/0095877 | A1* | 3/2019 | Li .......................... G06V 20/63 |
| 2020/0034958 | A1* | 1/2020 | Campbell ............. G06Q 40/08 |
| 2020/0111061 | A1* | 4/2020 | Stucki .................. G06V 10/764 |
| 2020/0175783 | A1* | 6/2020 | Adams ................. G07C 5/0808 |
| 2020/0273001 | A1* | 8/2020 | Taliwal ................ G06T 7/0004 |
| 2021/0350470 | A1* | 11/2021 | Lambert ............... G06Q 40/08 |
| 2022/0051338 | A1* | 2/2022 | Brandmaier ........... G06F 16/51 |

FOREIGN PATENT DOCUMENTS

| | | |
|---|---|---|
| KR | 1020190069457 A | 6/2019 |
| WO | 2017176304 A1 | 10/2017 |

OTHER PUBLICATIONS van Ruitenbeek, R. E., et al. "Vehicle Damage Detection using Deep Convolutional Neural Networks." (2019). (Year: 2019).*
"NAAA Vehicle Condition Grading Scale"—Wayback Machine indicates date at least on Sep. 23, 2017.
EBay Motors-How to Sell a Vehicle-Take Photographs, Jan. 19, 2009, 3 pages.
International Search Report issued in related PCT Application No. PCT/US2020/051931, mailed Feb. 2, 2021 (3 pages).
Jayawardena, Image Based Automatic Vehicle Damage Detection, Dec. 11, pp. 1-199. {Year: 2013}.
Koch, Forms, usability, and the W3C DOM, May 30, 2003, 8 pages.
Tom92909, How do you make a Dynamic Form auto populate fields?, 2009, 3 pages.
Tripathi, Getting a input field populated on entering the value in one input field, 2009, 3 pages.
VINtrack EZ OBD Full VIN Upgrade {Item #EZOBD}, Jan. 12, 2012, 3 pages.
Written Opinion of the ISA issued in related application No. PCT/US2020/051931, mailed Feb. 2, 2021 (5 pages).

* cited by examiner

VEHICLE SELF-INSPECTION APPARATUS AND METHOD

REFERENCE TO RELATED APPLICATIONS

This application is a continuation of U.S. application Ser. No. 17/027,283 (issued as U.S. Pat. No. 11,721,010), which claims the benefit of U.S. Provisional Application No. 62/903,930 filed on Sep. 22, 2019, the entirety of both of which are incorporated by reference herein.

BACKGROUND

Typically, when returning a leased vehicle, the leased vehicle is subject to an inspection, including assessing whether the leased vehicle is subject to excessive wear. However, it may be difficult to assess the amount of wear to the leased vehicle, leading to potential disputes between the lessor and the lessee of the vehicle.

DETAILED DESCRIPTION

Figure 1:
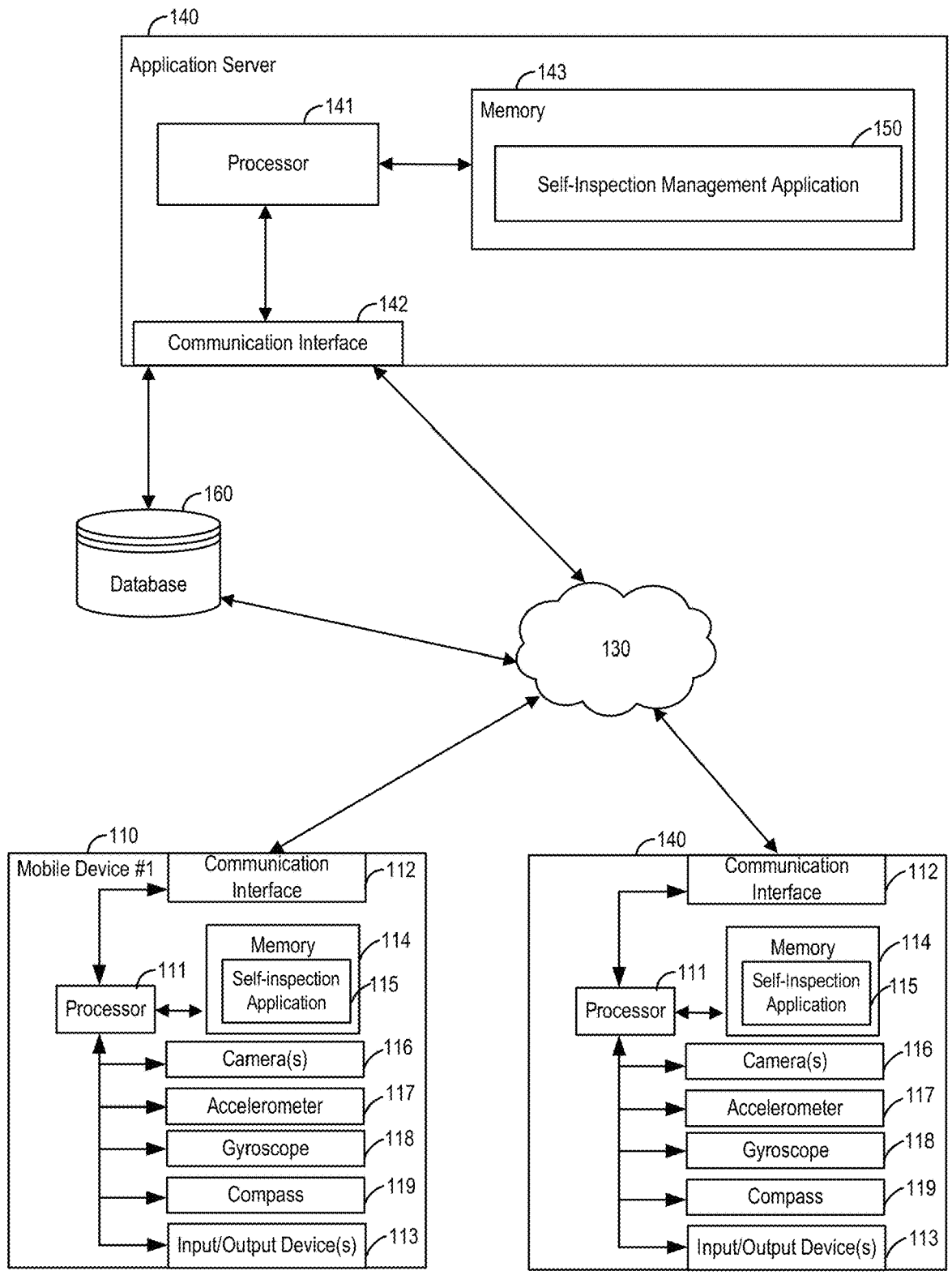
FIG. 1 illustrates an exemplary system for vehicle self-inspection.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Various types of goods may be sold, leased, temporarily used or the like. As one example, vehicles (e.g., cars, trucks, boats, or the like) may be sold, leased, temporarily rented. In such transactions, the vehicles may be subject to inspection by one or more parties. As one example when a leased vehicle is at the end of its lease, one or both of the lessee or the dealer (e.g., the lessor or the entity that leased the vehicle to the lessee) may perform an inspection. Typically, the inspection of the leased vehicle may be tedious and involved, requiring special skills to perform the inspection accurately and consistently. As another example, in the context of renting a car (or any other good, such as another type of vehicle (e.g., boat, bicycle, motorcycle, or the like), one or both of the rental car driver (RCD) or the entity that owns the rented good (e.g., the rental car company) may seek to inspect the good (e.g., the vehicle) at one or both of the following times: (1) when the RCD assumes responsibility of the good (e.g., when the RCD picks up the rental car from the rental car lot); and/or (2) when the RCD relinquishes responsibility of the good (e.g., when the RCD drops off the rental car at the rental car lot).

In one or some embodiments, an application (interchangeably referred to as an "app") or other piece of software may be configured to perform the self-inspection of the vehicle. In a first specific embodiment, the logic for the app may be entirely contained within a mobile device. For example, the logic to determine the estimated charges, discussed below, may be resident in the mobile device. In a second specific embodiment, the logic for the app may be entirely contained within a back-end server, with the mobile device providing a user interface to interact with a user. For example, the information to determine the estimated charges may be delivered from the mobile device to the back-end server, with the back-end server determining the estimated charges based on the information delivered. In turn, the back-end server may transmit the determined estimated charges to the mobile device for output to the user on the display of the mobile device. In a third specific embodiment, the logic for the app may be distributed between the back-end server and the mobile device. In this regard, any discussion regarding functions may be performed by one or both of the mobile device or a back-end server.

For example, the mobile device may comprise a portable electronic device, such as a smartphone, a tablet computer, a laptop computer or the like, with the mobile device configured to perform one or both of the following: (1) inputting data (e.g., images, video, text, etc.) regarding the self-inspection; and (2) processing capability configured to determine and/or output an assessment of the self-inspection. Thus, in one embodiment, the mobile device may entirely perform both (1) and (2), without reliance on the back-end server. Alternatively, the mobile device may entirely perform (1) and a portion of (2) regarding output of the assessment of the self-inspection, with the back-end server performing the processing to determine the assessment of the self-inspection. For example, the app on the mobile device may be configured to perform any one, any combination, or all of:

identify damage to the vehicle (e.g., based on manual input from the user (e.g., the user performing any one, any combination, or all of: identifying; categorizing; measuring, etc. the damage to the vehicle), based on automatic analysis (e.g., image analysis of images obtained of the vehicle), or based on a combination of manual input and automatic analysis;

assess a cost associated with the identified damage (e.g., a cost to repair or replace the item on the vehicle subject to the identified damage; or output an indication of the identified damage and/or the assessed cost.

In one or some embodiments, the mobile device is configured to perform each of identifying damage, assessing cost, and outputting the indication of the identified damage and/or the assessed cost. Alternatively, an electronic device remote from or separate from the mobile device may perform one or more of the above. For example, a back-end server, discussed further below, may identify the damage to the vehicle (e.g., obtain the manual input from the user and identify the damage, perform automatic analysis of the obtained images and/or video in order to identify the damage, or identify the damage based on a combination of manual input and automatic analysis. Alternatively, or in addition, the back-end server, using a cost engine, may assess the cost associated with the identified damage, and may transmit the assessed cost to the mobile device for output. In this regard, the back-end server, rather than the app, may include the cost engine to perform this functionality.

Thus, in one or some embodiments, the mobile device, via the app, may perform Excessive Wear and Use (EWU) analysis. In practice, one or both of the lessee or the dealer may use an estimation engine in order to perform the EWU analysis, such as before and/or after the leased vehicle is turned into the dealer. For example, the lessee may generate a first damage report at a first time and the dealer may generate a second damage report at a second time, with the second time being different from the first time (e.g., the second time being later chronologically than the first time). As part of the EWU analysis, the mobile device may generate an output as to the charges. In one embodiment, the output may comprise a running total. For example, as the lessee and/or dealer walks around the vehicle, damage information (e.g., images, video, text information) may be input. In particular, the lessee and/or dealer may first walk around the exterior of the vehicle in order to identify damage to the exterior (e.g., scratch to the bumper, dent to the driver's side, etc.) After which, the lessee and/or dealer may input damage to the interior of the vehicle (e.g., a tear in the front passenger seat, wear on the console, etc.). Responsive to identifying damage to the vehicle, the EWU analysis may determine a cost associated with the damage and responsive to determining the cost, dynamically update/output a running tally of a list and/or costs associated with the damage. For example, the EWU analysis may generate a dollar amount as to the damage, with the dollar amount being increased as the EWU analysis identifies additional damage/cost of repair of the vehicle as the lessee and/or the dealer inputs the information. In this way, the lessee and/or the dealer has immediate (or near immediate) feedback as to the costs associated with the damage.

Further, in one or some embodiments, the EWU analysis may generate an itemized list of the excessive wear (e.g., over-mileage and/or damage to the vehicle). Further, the user, such as the lessee and/or the dealer, may access the itemized list of the excessive wear, which may correlate entries in the itemized list to images of the damage (e.g., an entry in the itemized list may be for a tear to the front passenger seat, with an image of the front passenger seat showing the tear being correlated to the entry). Alternatively, or in addition, the itemized list may be correlated to the charge. In the example of the tear to the front passenger seat, the entry may further be correlated to the cost of repairing the tear. In this way, the user may review the itemized list (and optionally the corresponding images for entries on the itemized list), and may recategorize an entry in the list or remove the item.

As discussed above, the app (or other software construct) resident in the mobile device may be configured or include a cost engine configured to set or determine the charges to the lessee for damage to the vehicle. Alternatively, or in addition, the app may include one or more rules that: include intelligence to determine whether the damage is chargeable to the lessee (e.g., determine whether the damage is considered ordinary wear-and-tear or not); include intelligence to determine whether the damage has already been accounted for (and is therefore not chargeable to the lessee). As one example, a part of the vehicle, such as a hubcap, may have multiple scratches. The app may determine that the hubcap will be replaced (e.g., the lessee will be charged for the replacement of the hubcap responsive to identifying the $1^{st}$ scratch); however, the lessee will not be charged for the $2^{nd}$ and $3^{rd}$ scratches because the hubcap is being replaced. In this way, the app is configured to intelligently assess costs associated with the damage to the vehicle. Alternatively, the cost engine may be resident on the back-end server, as discussed above.

In one or some embodiments, the process of self-inspection may result in a report. Typically, the lessee will first use the app to obtain images and to identify damage in a report (e.g., the lessee damage report); thereafter, the dealer may use the app to generate a report (e.g., the lessor or dealer damage report). The resulting self-inspection report may be used in various contexts. In one context whereby the self-inspection report is incomplete, a user may resume the self-inspection.

In another context, a previous self-inspection report may be used to pre-populate a subsequent self-inspection. For example, a back-end server may use the lessee damage report in order to pre-populate the dealer's app so that the dealer may step through the self-inspection process quicker in order to quickly confirm the damage to the vehicle. The pre-population may comprise any one or both of: (1) identifying one or more damage entries correlated to the predetermined views; or (2) identifying images associated with the damage entry. In particular, for one, some, or all predetermined views, the screen on the mobile device for the respective view may be populated with a type of damage (e.g., responsive to identifying the current image on the screen as the driver side view, the damage identified in the lessee damage report, such as a scratch on the driver side, may be listed on the screen of the mobile device; alternatively, or in addition, an image of the damage, taken by the lessee and part of the lessee damage report, may be output on the screen, such as an image of the scratch on the driver side).

In still another context, separate reports, such as a lessee damage report and a dealer damage report, may be generated, with the separate reports being reconciled. For example, the lessee may generate the lessee damage report prior to the lessee ending the lease. The dealer may generate its dealer damage report after the vehicle is off-lease. The lessee damage report and the dealer damage report may be compared to one another to determine discrepancies (e.g., a damage entry in the dealer damage report that is not includes in the lessee damage report). In the event that there is further damage detailed in the dealer damage report versus the lessee damage report, the mobile device or the back-end server may reconcile the difference in one of several ways, including any one, any combination, or all of: (i) flagging the differences in the reports (e.g., flagging that the dealer damage report has one or more damage items that are not included in the lessee damage report); (ii) automatically analyzing at least one aspect of one or both of the lessee damage report or the dealer damage report in order to reconcile the reports; or (iii) outputting, such as via the app, the discrepancies in the report.

For example, with regard to the automatic analysis, the dealer damage report may indicate a scratch on the back panel on the driver side whereas the lessee damage report does not indicate such damage. In response to identifying this discrepancy, the mobile device or the back-end server may analyze the image for the driver side in both the lessee damage report and the dealer damage report to determine one or both of: (a) whether, via artificial intelligence (AI) or other scratch-recognition technology, there is a scratch in the image of the driver side from the dealer damage report and/or in the image of the driver side from the lessee damage report; or (b) whether the pixels in the portion of the image (associated with the back panel) of the driver side in the dealer damage report and the lessee damage report are the same or different. In the event that the backend server determines that there is a scratch on the back panel in the image from the lessee damage report, the backend server may report to one or both of the dealer or the lessee that the images in the lessee damage report indicate a scratch on the back panel of the driver side (e.g., the report from the backend server may highlight the part of the image associated with the back panel, such as by blowing up or zooming in on that part of the image and/or superimposing a box (or some other predefined shape) to highlight or indicate the identified scratch within the image). In this way, the image may be modified in order to highlight the discrepancy.

In one or some embodiments, the cost engine may be configured for multiple modes, selectable by a user. For example, different modes may include a turn-in mode, whereby the lessee turns in the vehicle and an upgrade mode, whereby the lessee upgrades to leasing another vehicle. The mobile device may present the different modes to the lessee for selection. Upon selection, the cost engine may access different rules responsive to the selected mode. In particular, responsive to selection of the upgrade mode, the cost engine may issue certain credits and/or apply different rules than the calculation in the turn-in mode.

Further, in one or some embodiments, the app executing on the mobile device and/or the back-end server may use augmented reality-based measurement capability. For example, the user may walk around the vehicle in order to build a 3D rendered object. In this way, rather than examining pictures of the vehicle, a 3D representation may be generated, tagged with the damage entries. For example, a "tag" in 3D space may identify damage (e.g., mapped into 3D space). In this way, the 3D representation may be generated with the damage associated with or projected onto it. Specifically, the 3D object may be generated with the damage entries, tied to 3D space, and associated with the 3D object.

Referring to the figures, FIG. 1 illustrates an exemplary system 100 for self-inspection application, the self-inspection application for performing any one, any combination, or all of: obtaining target views; inputting wear assessment (e.g. damage or excessive wear assessment) of the vehicle; or determining costs associated with repair of the vehicle. The system 100 includes an application server 140 configured to include the hardware, software, firmware, and/or middleware for operating the self-inspection management application 150. Application server 140 is shown to include a processor 141, a memory 143, and a communication interface 142.

The self-inspection management application 150 may be a representation of software, hardware, firmware, and/or middleware configured to implement the management of any one, any combination, or all of the stages of self-inspection. The system 100 may further include a database 160 for storing data for use by the self-inspection management application 150. For example, self-inspection reports may be stored in database 160.

The application server 140 may communicate with the database 160 directly to access the data. Alternatively, the application server 140 may also communicate with the database 160 via network 130 (e.g., the Internet). Though FIG. 1 illustrates direct and indirect communication, in one implementation, only direct communication is used, in an alternate implementation, only indirect communication is used, and still in an alternate implementation, both direct and indirect communication is used.

The application server 140 may communicate with any number and type of communication devices via network 130. For example, application server 140 may communicate with electronic devices associated with one or more users. For example, FIG. 1 depicts two mobile devices, including mobile device #1 (110) and mobile device #2 (140). The depiction in FIG. 1 is merely for illustration purposes. Fewer or greater numbers of mobile devices are contemplated.

Mobile device #1 (110) and mobile device #2 (140) shown in FIG. 1 may include well known computing systems, environments, and/or configurations that may be suitable for implementing features of the self-inspection application 115 such as, but are not limited to, smart phones, tablet computers, personal computers (PCs), server computers, handheld or laptop devices, multiprocessor systems, microprocessor-based systems, network PCs, or devices, and the like. FIG. 1 further shows that mobile device #1 (110) and mobile device #2 (140) include a processor 111, a memory 114 configured to store the instructions for operating the self-inspection application 115 (the functionality being discussed further below), input/output device(s) 113 (such as touch sensitive displays, keyboards, or the like), and a communication interface 112.

Mobile device #1 (110) and mobile device #2 (140) may also include one or more cameras 116, an accelerometer 117, a gyroscope 118, compass 119, or other positional, directional, orientational, angular, or accelerational sensors. As discussed further below, one or more of these sensors may be used to select a frame for one or more of the views of the vehicle.

The memory, as part of the self-inspection application 115 or separately, may store one or more indicators for predetermined views of the vehicle. As discussed further below, predetermined views of the vehicle may comprise exterior predetermined view(s) (e.g., a driver side view, a rear view, a passenger side view, a front view, etc.) and/or interior predetermined view(s) (e.g., a console view, a navigational system view, etc.). This is illustrated, for example, in U.S. Pat. No. 10,089,396, incorporated by reference herein in its entirety. Each respective view may include one or more indicators indicative of the respective view. The app may include one or more sets of predetermined views. Further, in one implementation, the app may select the one or more sets of predetermined views based input. As one example, a Vehicle Identification Number (VIN) may be input (such as by typing in the VIN or by taking a picture of the VIN and decoding the VIN in the picture, as disclosed in U.S. Pat. No.

10,089,396, incorporated by reference herein in its entirety). Based on the VIN input, the app may select a set of predetermined views, such as a predetermined set of views directly correlated to the VIN or a predetermined views partially correlated to the VIN (e.g., the VIN indicates a type of vehicle, such as an SUV, with the set of predetermined views correlated to the type of vehicle). In this way, images of the predetermined views may be obtained.

Further, excessive wear and usage information, such as damage information, may be input in one of several ways, such as manually, automatically, or partly manually/partly automatically, such as disclosed in U.S. Patent Application Ser. No. 62/647,457 entitled "METHOD AND SYSTEM FOR OBTAINING VEHICLE TARGET VIEWS FROM A VIDEO STREAM" and in U.S. patent application Ser. No. 16/174,772 entitled "METHOD AND SYSTEM FOR OBTAINING VEHICLE TARGET VIEWS FROM A VIDEO STREAM", both of which are incorporated by reference herein in their entirety. Responsive to inputting the images and/or the excessive wear and usage information, EWU costs, such as the costs for repair and/or the costs for excessive usage, may be calculated.

The various electronic devices depicted in FIG. 1 may be used in order to implement the functionality discussed herein. In this regard, each of mobile device #1 (110), mobile device #2 (140), application server 140, and database 160 may include one or more components of computer system 200 illustrated in FIG. 2.

Figure 2:
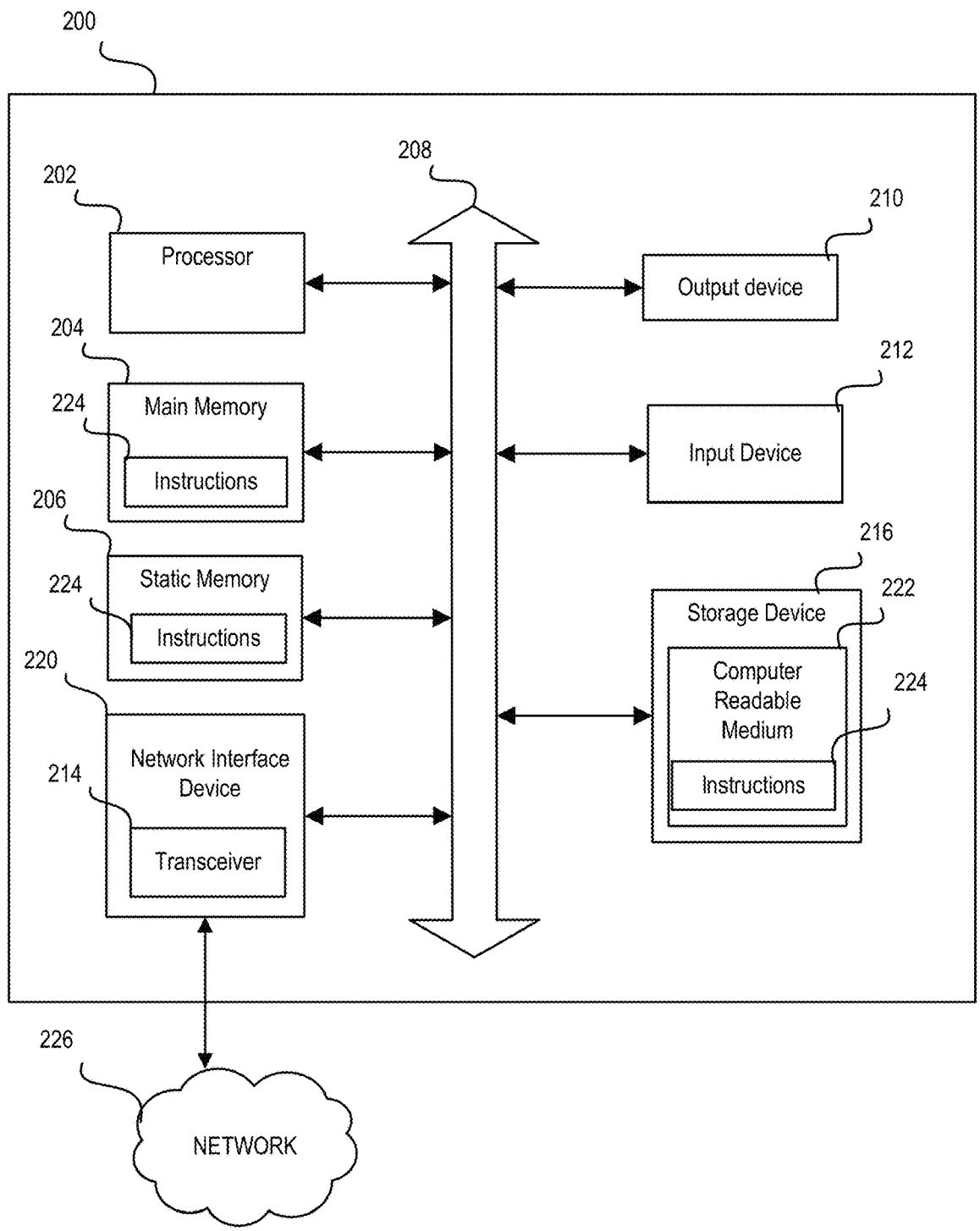
FIG. 2 illustrates a block diagram of exemplary computer architecture for a device in the exemplary system of FIG. 1.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an implementation, network 226 may support wireless communications. In another implementation, network 226 may support hard-wired communications, such as a telephone line or cable. In another implementation, network 226 may support the Ethernet IEEE (Institute of Electrical and Electronics Engineers) 802.3x specification. In another implementation, network 226 may be the Internet and may support IP (Internet Protocol). In another implementation, network 226 may be a LAN or a WAN. In another implementation, network 226 may be a hotspot service provider network. In another implementation, network 226 may be an intranet. In another implementation, network 226 may be a GPRS (General Packet Radio Service) network. In another implementation, network 226 may be any appropriate cellular data network or cell-based radio network technology. In another implementation, network 226 may be an IEEE 802.11 wireless network. In still another implementation, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the self-inspection application 115. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that the self-inspection management application 150 or the self-inspection application 115 illustrated in FIG. 1.

Although computer system 200 is represented in FIG. 2 as a single processor 202 and a single bus 208, the disclosed implementations applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other implementations, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the self-inspection management application 150 and/or the self-inspection application 115.

Storage device 216 may include a controller (not shown) and a computer readable medium 222 having instructions 224 capable of being executed by processor 202 to carry out functions of the self-inspection management application 150 and/or the self-inspection application 115. In another implementation, some or all of the functions are carried out via hardware in lieu of a processor-based system. In one implementation, the controller included in storage device 216 is a web application browser, but in other implementations the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly, in some implementations output device 210 displays a user interface. In other implementations, output device 210 may be a speaker configured to output audible information to the user. In still other implementations, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 3:
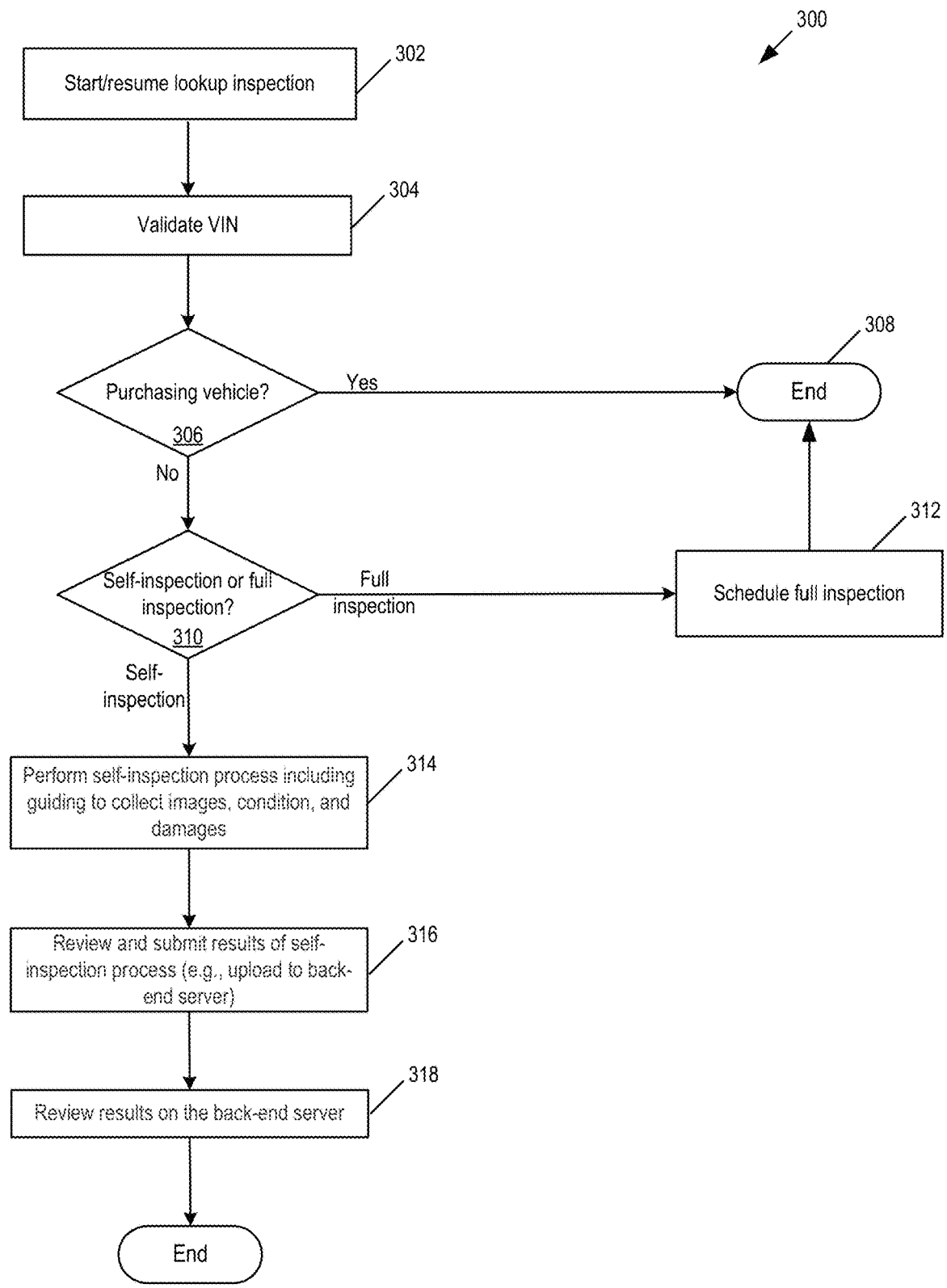
FIG. 3 illustrates a first flow diagram of logic to perform self-inspection.

As discussed above, the self-inspection app may be used to assist in inspection of a vehicle or other type of goods. In this regard, any discussion regarding the self-inspection app as directed to a vehicle may likewise be applied to any other type of goods. FIG. 3 illustrates a first flow diagram 300 of logic to perform self-inspection. At 302, the lookup inspection is either started or resumed. At 304, the vehicle identification number (VIN), or other identification for the vehicle, is validated. As one example, an image of the VIN may be obtained, and decoded (either by the app at the mobile device or at the back-end server). The VIN may be correlated to the dealer that leased the vehicle.

At 306, it is determined whether the lessee is purchasing the vehicle. If so, no inspection need be performed, and flow diagram 300 may end at 308. If not, at 310, it is determined whether a self-inspection is to be performed or a full-inspection is to be performed. For example, the lessee may elect not to perform the self-inspection. Alternatively, or in addition, certain circumstances, such as whether the vehicle was subject to an accident, necessitates a full-inspection be performed. Thus, if a full inspection is to be performed, at 312, the full inspection is scheduled.

If self-inspection is to be performed, at 314, a self-inspection process is performed, which may include guiding to collect images, condition, and damages. At 316, the results of the self-inspection process may be reviewed and submitted (e.g., uploaded to back-end server). At 318, the results may be reviewed, such as reviewing the results that are stored on the back-end server.

Figure 4:
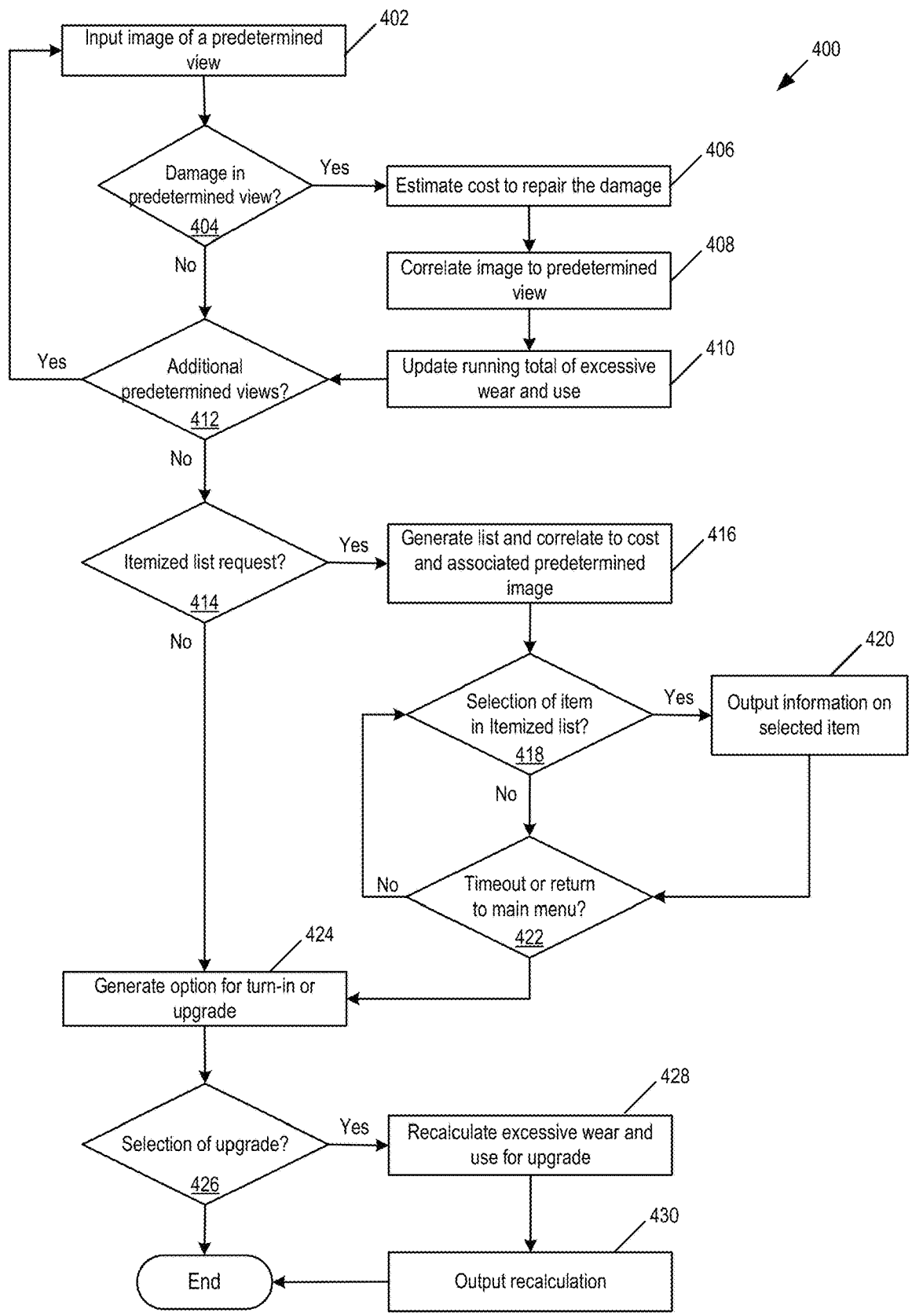
FIG. 4 illustrates a second flow diagram of logic to perform self-inspection.

FIG. 4 illustrates a second flow diagram 400 of logic to perform self-inspection. At 402, an image of a predetermined view is input. As discussed above, various predetermined views may be input. Example predetermined views include any one, any combination, or all of: Front; Driver Side; Rear; Passenger Side; Interior Front; Interior Rear; or Instrument Cluster. At 404, it is determined whether there is damage associated with the predetermined view. As discussed above, damage in a respective view may be determined via manual input (e.g., the user tapping the screen of the mobile device to indicate an area of damage), automatic determination, or manual input/automatic determination. Separate from damage, information regarding missing items for the vehicle and/or broken equipment may be input. This is illustrated in FIG. 8F.

As discussed above, the damage information may be input in a variety of ways. As one example, responsive to obtaining an image of a predetermined view, the user may be solicited to manually input damage to the predetermined view. The manual input may comprise any one, any combination, or all of: a type of damage (e.g., scratch versus rust); an indication of the part at which the damage occurs (e.g., the back panel on the driver side); or a severity of the damage (e.g., the depth of the scratch). As another example, responsive to obtaining the image of the predetermined view, the system (either at the mobile device or at the back-end server) may automatically analyze the obtained image of the predetermined view in order to determine any one, any combination, or all of: the type of damage; the indication of the part at which the damage occurs; or the severity of the damage. As still another example, responsive to obtaining the image of the predetermined view, damage may be determined based on a combination of manual input and automatic analysis. In one particular example, automatic analysis of the obtained image of the predetermined view may result in one, some or all of the following: (1) an identification of the location within the image of the potential damage; (2) a reduction in the possible types of damage; or (3) a reduction in the possible levels of severity of damage. For example, prior to the automatic analysis, the possible damage associated with the driver side view includes scratches, dents, and rust, and the possible levels of severity of damage includes low, low-medium, medium, medium-high, and high. After the automatic analysis, the system may reduce the possible damage associated with the driver side view to only scratches and dents (thereby removing rust), and the possible levels of severity of damage to only low or low-medium (thereby removing medium, medium-high, and high). The system may then proffer these reduced possibilities to the user from which to select.

Responsive to determining that damage is present in the respective view, at 406, the app on the mobile device may estimate the cost to repair the damage. Thus, in one embodiment, the cost estimate is performed locally using an estimation engine resident in the mobile device. Alternatively, the cost estimate is performed remotely, such as by using an estimation engine resident in the back-end server. The cost estimate may be generated in one of several ways. In one way, one or more attributes associated with the damage may be input. As merely one example, the attributes may comprise the part associated with the damage and the severity of the damage. In one embodiment, the part may be correlated with a part code (such as for purposes of replacement or repair) and the severity may be correlated with a severity code (such as an indication of the extent of the damage). In a first specific embodiment, both the part code and the severity code may be used by the estimation engine to generate the cost estimate associated with replacing or repairing the associated damage. In a second specific embodiment, only one of the part code or the severity code is used by the estimation engine to generate the cost estimate associated with replacing or repairing the associated damage (e.g., only the part code is used when the part will be replaced).

At 408, the image for the predetermined view is correlated to the predetermined view. This is illustrated, for example, in FIG. 8H, which may show thumbnails for one, some, or each of the predetermined views. Further, the user may click on (or provide some other manual input) a respective thumbnail to view the image. At 410, the app may update the running total for the cost associated with the excessive wear and use. For example, the screen of the mobile device may include a number indicating the total costs associated with the excessive wear and use. Thus, responsive to the app identifying a cost, the app may update the running total to keep the user apprised in real-time as to the total costs associated with the excessive wear and use.

At 412, the app determines whether additional predetermined views of the vehicle are to be obtained. If so, flow diagram 400 loops back to 402 thereby iterating for the different predetermined views. Otherwise, flow diagram 400 flows to 414, which determines whether the user has requested an itemized list. Alternatively, the user may request an itemized list at any time, including before all predetermined views of the vehicle are obtained.

If so, at 416, the app generates an itemized list and correlates to the cost and associated predetermined image. At 418, the app determines whether the user selected an item or entry in the itemized list. If so, at 420, the app outputs information on the selected item, such as the image associated with the selected item or entry and/or the cost associated with repairing or replacing the selected item or entry. Otherwise, at 422, the app determines whether there has been a timeout or a user request to return to the main menu.

At 424, the app generates an output requesting whether the lessee wants to turn-in the vehicle or upgrade. At 426, the app determines whether the lessee selected the option to upgrade the vehicle. If so, at 428, the app recalculates the excessive wear and use calculation for the upgrade. As discussed above, the cost engine may be configured for multiple modes. Based on lessee selection of the upgrade, the cost engine may be configured for upgrade mode in which different charges or credits are implemented. An example of this is illustrated in FIGS. 8I-J, discussed further below. After which, at 430, the recalculation of the excessive wear and use is output.

Figure 5:
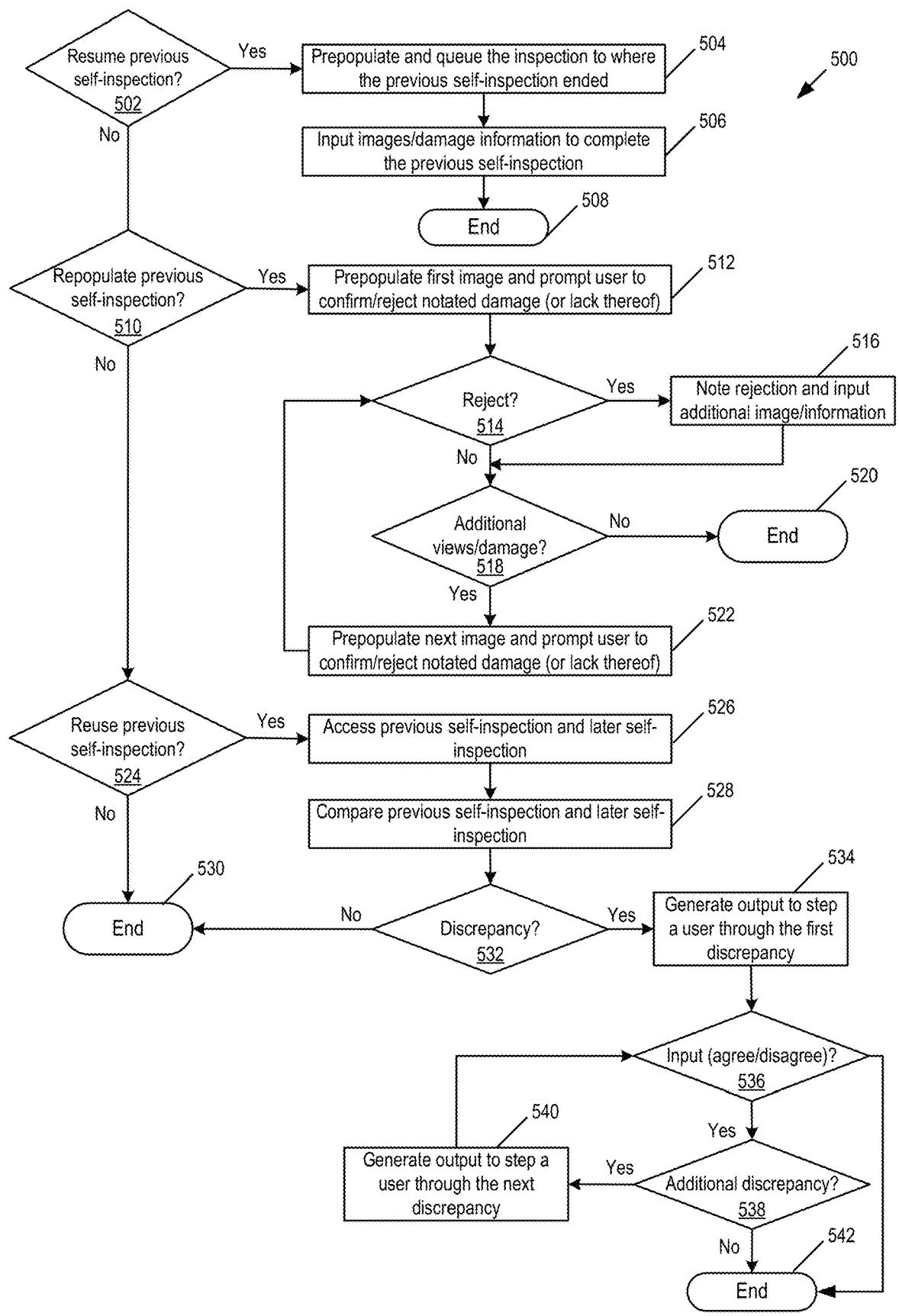
FIG. 5 illustrates a third flow diagram of logic to perform self-inspection in which a previous inspection is resumed or repopulated or a new inspection is performed.

FIG. 5 illustrates a third flow diagram 500 of logic to perform self-inspection in which a previous inspection is resumed or repopulated or a new inspection is performed. As discussed above, a previous inspection may be resumed or repopulated. For example, at 502, the app determines whether to resume a previous self-inspection. This determination may be based on input of a VIN, which is correlated to a self-inspection that is tagged as incomplete and therefor in need of resuming for completion. At 504, the app prepopulates and queues the inspection to where the previous self-inspection ended. As discussed above, the app may input various predetermined views for a complete report. As such, the app may prepopulate and queue the inspection for the next predetermined view to obtain in order to complete the report. At 506, the app may input images/damage information for the various predetermined views in order to complete the previous self-inspection. After which, at 508, flow diagram 500 ends.

At 510, the app determines whether to repopulate a previous self-inspection. As discussed above, the lessee may perform a self-inspection. After which, the dealer may use the self-inspection by stepping through the lessee's self-inspection for the dealer to approve or reject. If so, at 512, the app prepopulates the first image and prompts the user (such as the dealer) to confirm/reject the assessment as determined by the lessee's self-inspection (e.g., confirm/reject the notated damage or confirm/reject the lack of damage). At 514, the app receives the input from the user to determine whether the user rejects the lessee's self-inspection of the respective view. If the user rejects the lessee's self-inspection of the respective view, at 516, the app notes the rejection by the user and optionally inputs additional image/information. For example, in the instance where the lessee's self-inspection and the dealer identifies damage, the dealer may input additional image/information in the form of an additional image showing the damage and/or a notation identifying the specifics of the damage. If the user does not reject the lessee's self-inspection of the respective view, at 518, the app determines whether there are any further additional views and/or damage. If not, flow diagram 500 ends at 520. If so, at 522, the app prepopulates next image and prompts user to confirm/reject notated damage or lack of damage, and loops back to 514.

At 524, it is determined whether to reuse a previous self-inspection. As discussed above, the lessee and the dealer may both perform self-inspections with the reports from each of the self-inspections being compared for discrepancies. If so, at 526, the back-end server may access a previous self-inspection and a later self-inspection and at 528, compare the previous self-inspection and the later self-inspection. Alternatively, the app on the mobile device may perform 526 and 528. At 532, the back-end server or the app determines whether there are any discrepancies between the previous self-inspection and the later self-inspection. For example, the dealer self-inspection may include damage that is not indicated in the lessee self-inspection. If not, flow diagram 500 ends at 530. If so, at 534, the back-end server or the app generates an output to step a user through the first discrepancy. At 536, the back-end server or the app determines whether the user (e.g., the dealer and/or the lessee) agrees or disagrees with the previous self-inspection (e.g., the lessee self-inspection) and/or the later self-inspection (e.g., the dealer self-inspection). At 538, the back-end server or the app determines whether there are additional discrepancies. If not, flow diagram 500 ends at 542. If so, at 540, the back-end server or the app generates an output to step a user through the next discrepancy, and loops back to 536. As discussed below with regard to FIG. 11, responsive to determining a discrepancy, additional analysis (such as AI analysis) may be performed to determine whether the damage, not indicated in the lessee damage report, is actually present in the images included in the lessee damage report.

Figure 6:
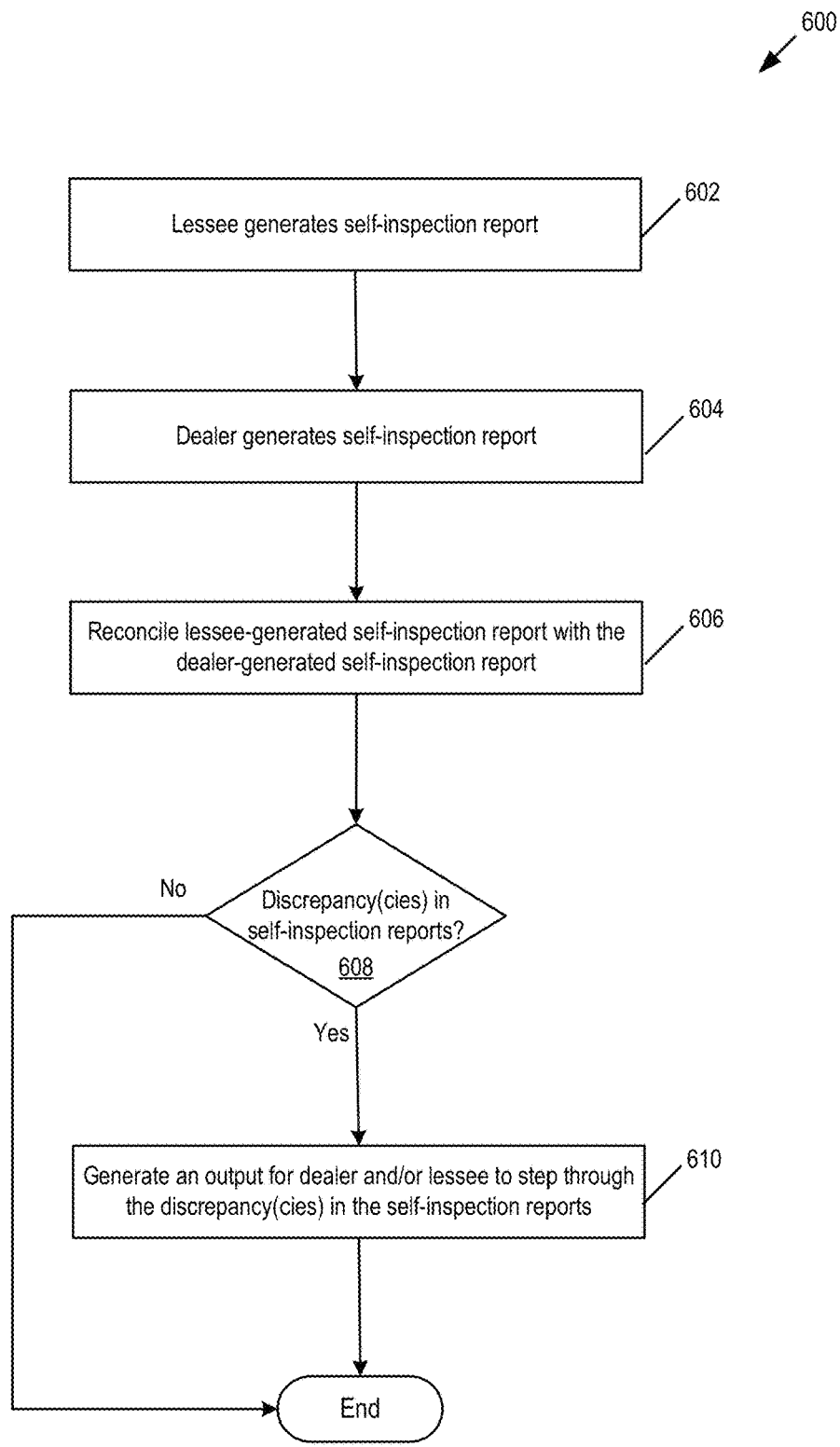
FIG. 6 illustrates a fourth flow diagram of logic in which the lessee and the dealer perform self-inspections of the leased vehicle.

FIG. 6 illustrates a fourth flow diagram 600 of logic in which the lessee and the dealer perform self-inspections of the leased vehicle. At 602, the lessee generates a self-inspection report. At 604, the dealer generates a self-inspection report. At 606, lessee-generated self-inspection report is reconciled with the dealer-generated self-inspection report. At 608, it is determined whether there are discrepancies between the lessee-generated self-inspection report and the dealer-generated self-inspection report. If not, flow diagram 600 ends. If so, at 610, an output is generated for the dealer and/or the lessee to step through the discrepancy (discrepancies) in the self-inspection reports.

Figure 7:
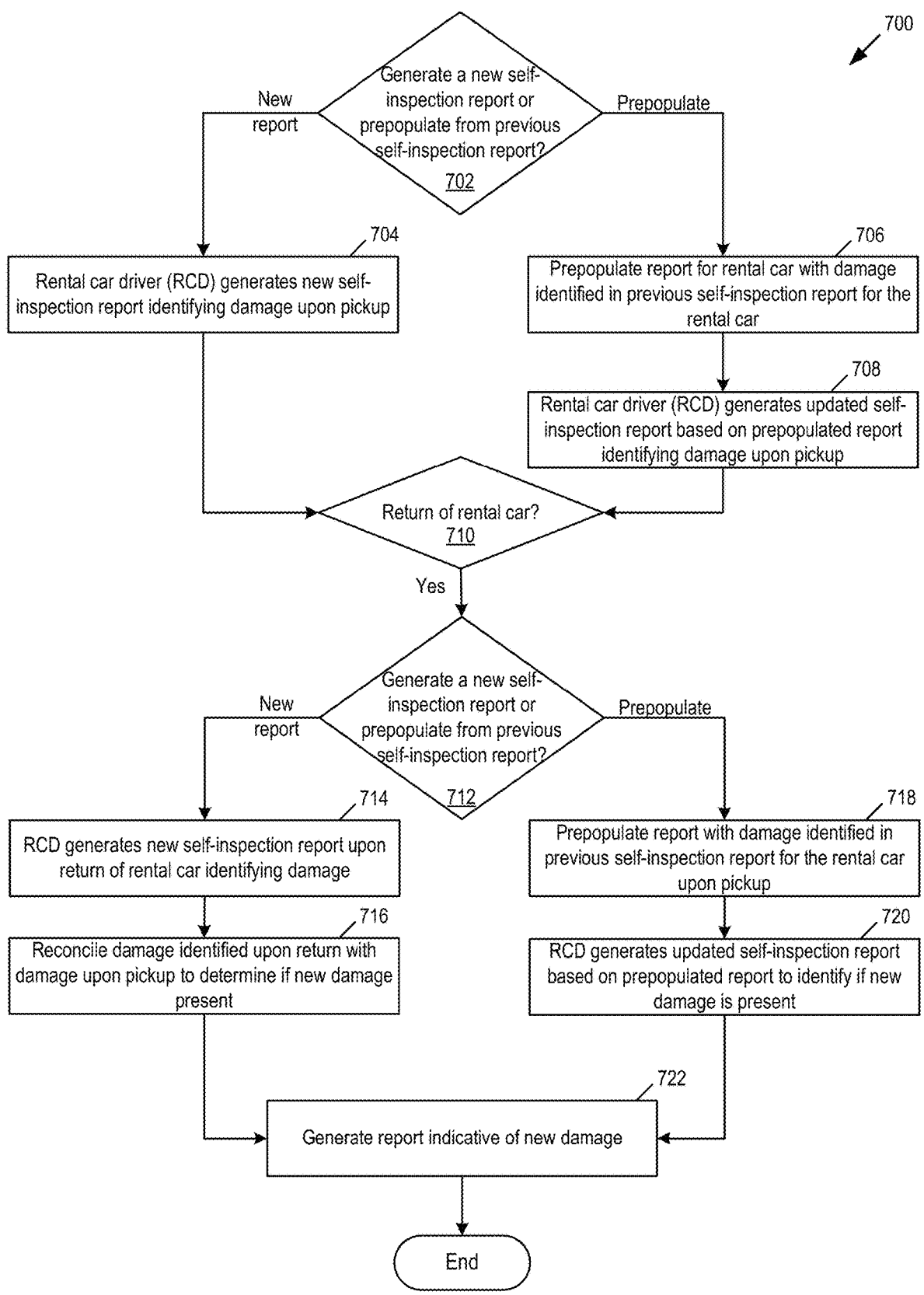
FIG. 7 illustrates a fifth flow diagram of logic in which a rental car driver performs the self-inspection of the rental car.

FIG. 7 illustrates a fifth flow diagram 700 of logic in which a rental car driver performs the self-inspection of the rental car. At 702, it is determined whether to generate a new self-inspection report or to prepopulate from previous self-inspection report. If it is determined to prepopulate, at 706, prepopulate a report for the rental car with damage identified in previous self-inspection report for the rental car for output on an app of a mobile device. At 708, the rental car driver (RCD), using the app on the mobile device, generates an updated self-inspection report based on prepopulated report identifying damage upon pickup. For example, the prepopulated report may indicate the damage already present in the various predetermined views. Upon pickup of the rental car, the RCD may supplement the prepopulated report with additional damage found in one or more of the predetermined views that is not present in the prepopulated report. Alternatively, at 704, the RCD, using the app, generates a new self-inspection report identifying damage upon pickup. For example, the RCD may step through each of the predetermined views in order to identify all of the damage in each of the predetermined views.

At 710, it is determined whether the rental car has been returned. If so, at 712, it is determined whether to generate a new self-inspection report or prepopulate from previous self-inspection report. If it is determined to prepopulate, at 718, prepopulate, for output on the app, a report with damage identified in the previous self-inspection report for the rental car upon pickup. At 720, the RCD, using the app, generates an updated self-inspection report based on prepopulated report to identify if new damage is present. If it is determined to generate a new report, at 714, the RCD, using the app, generates new self-inspection report upon return of rental car identifying damage by stepping through each of the predetermined views. At 716, the damage identified upon return is reconciled with damage upon pickup to determine if new damage present. At 722, a report is generated indicative of the new damage.

Figure 8A:
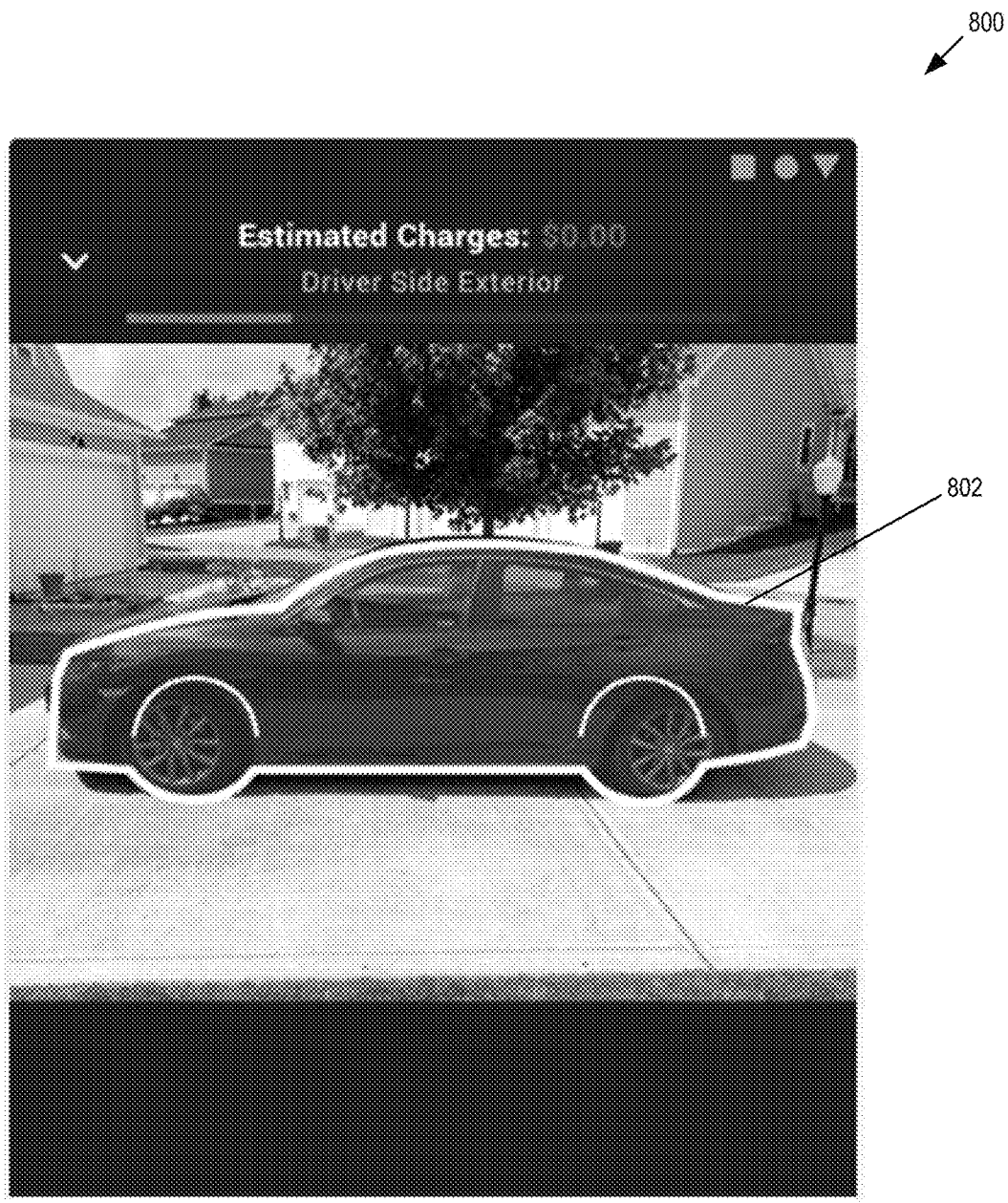
FIGS. 8A-J illustrate various graphical user interfaces (GUIs) for the self-inspection app.
Figure 8B:
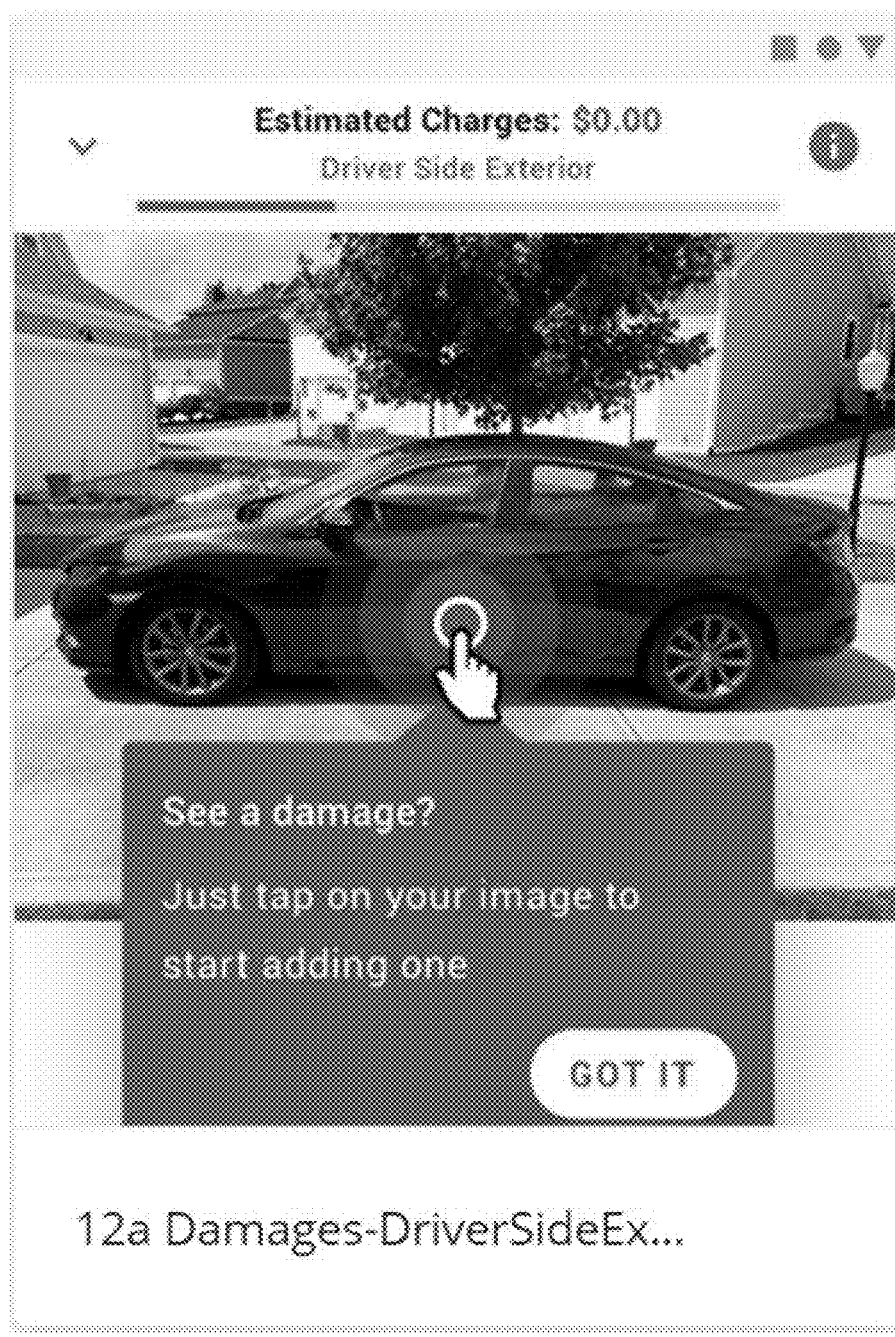
Figure 8C:
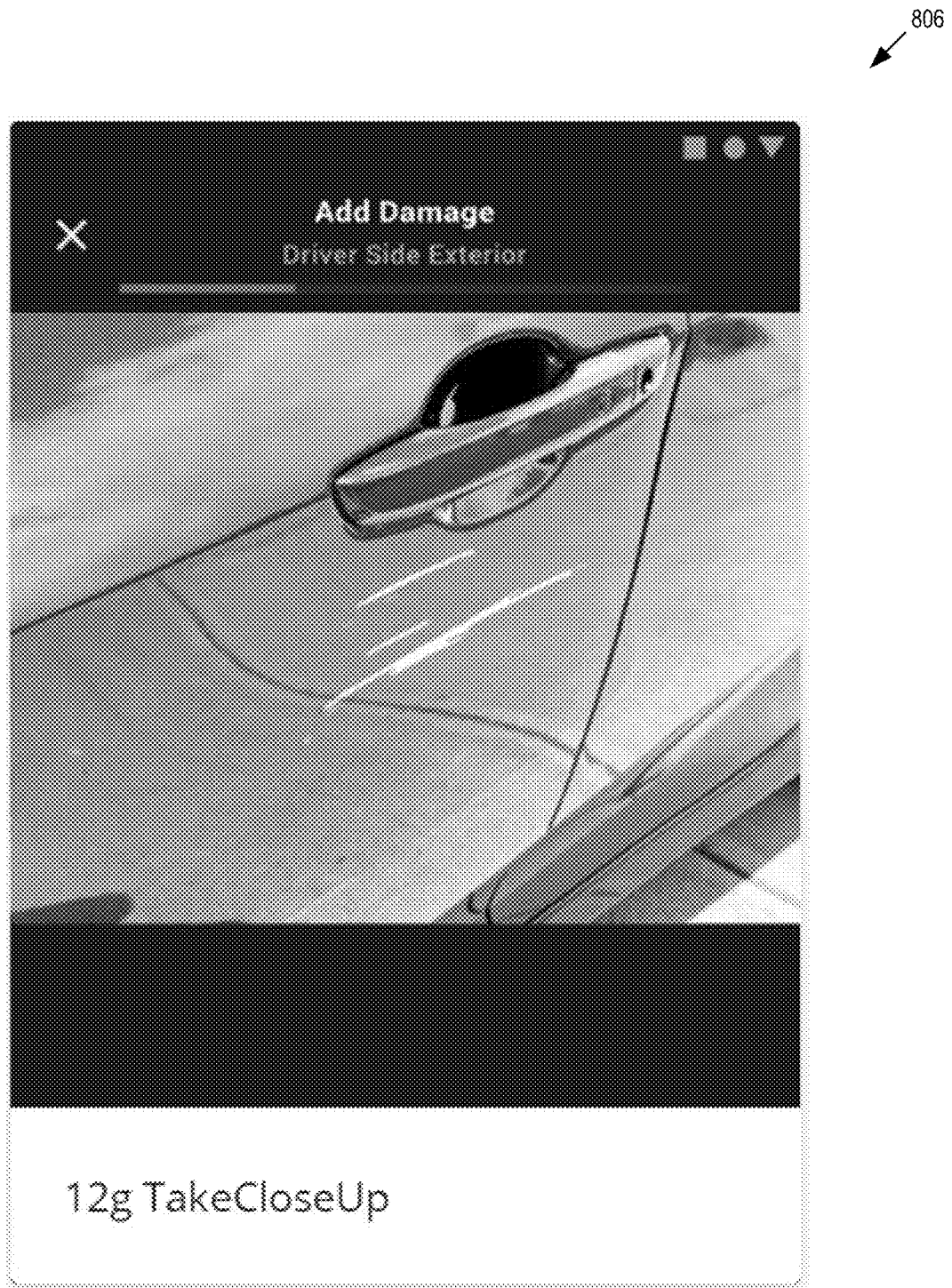
Figure 8D:
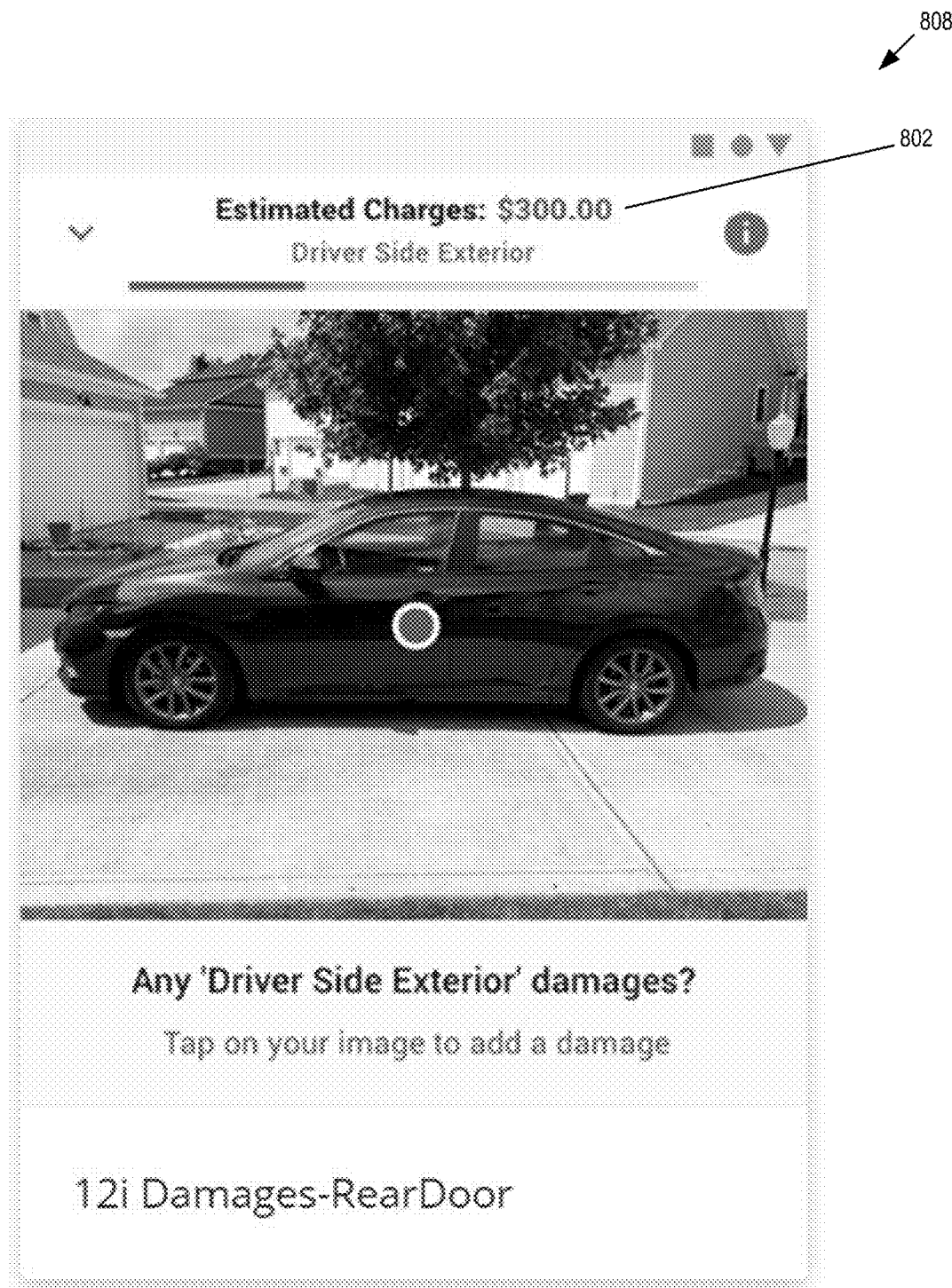
Figure 8E:
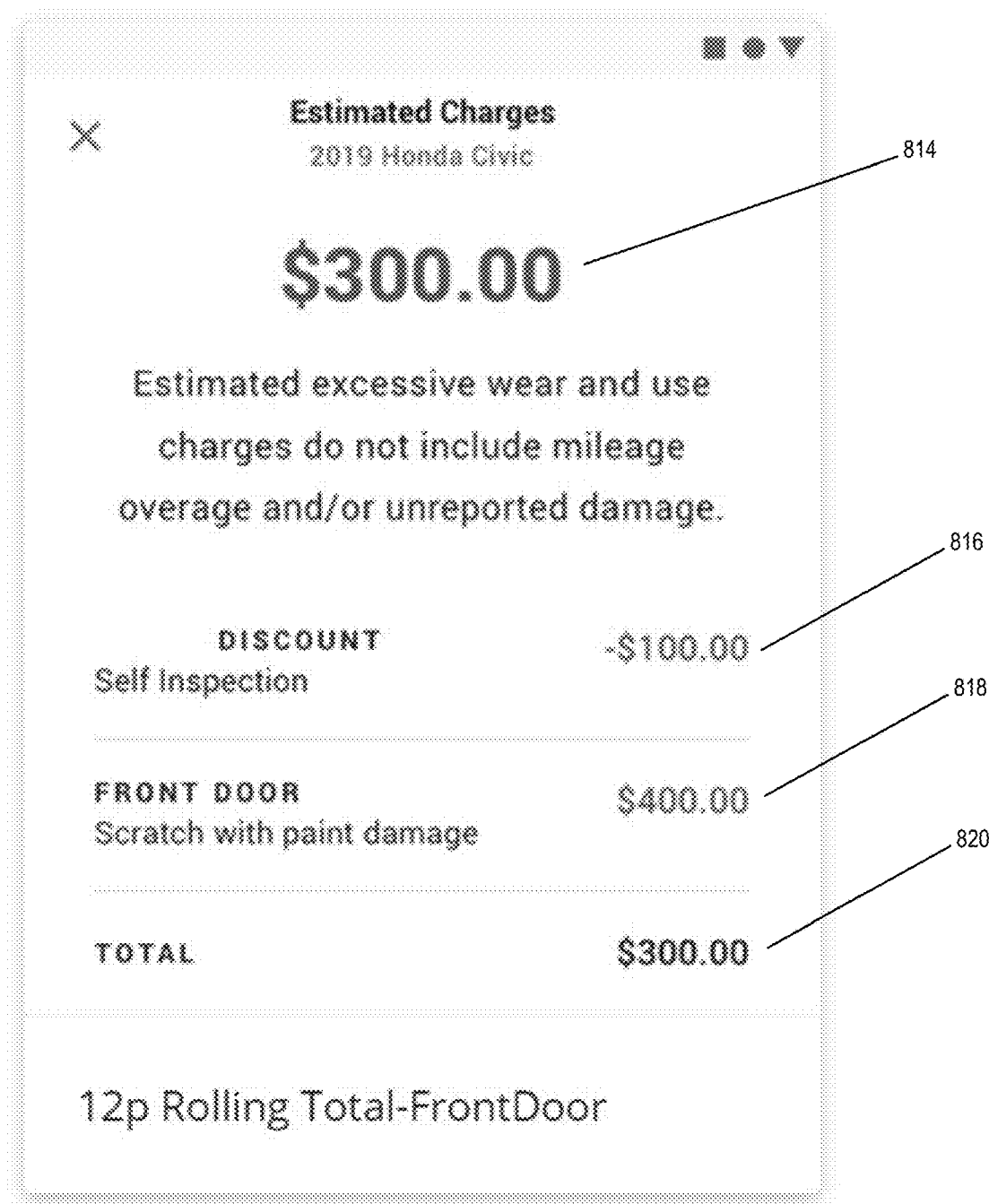
Figure 8F:
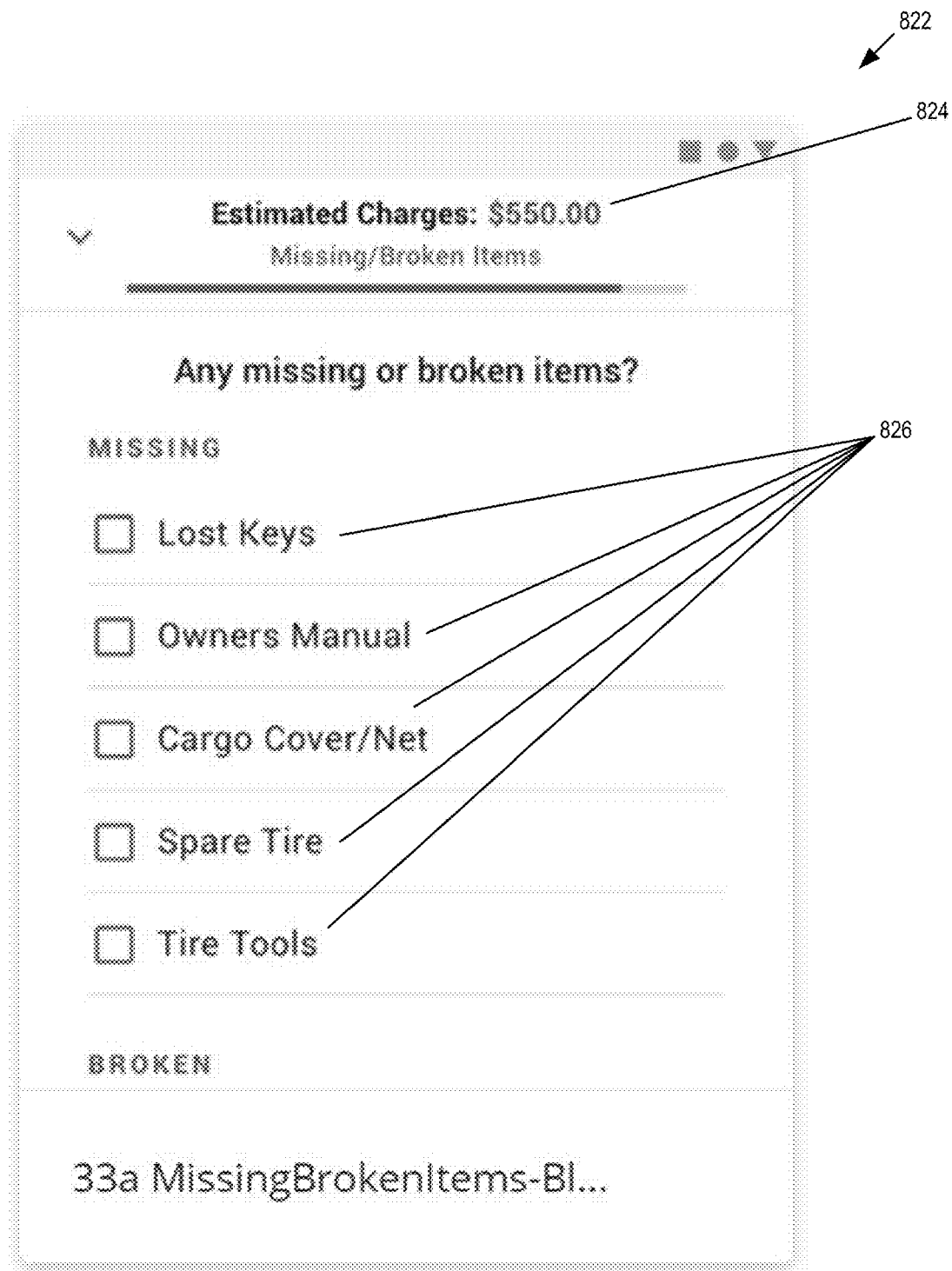
Figure 8G:
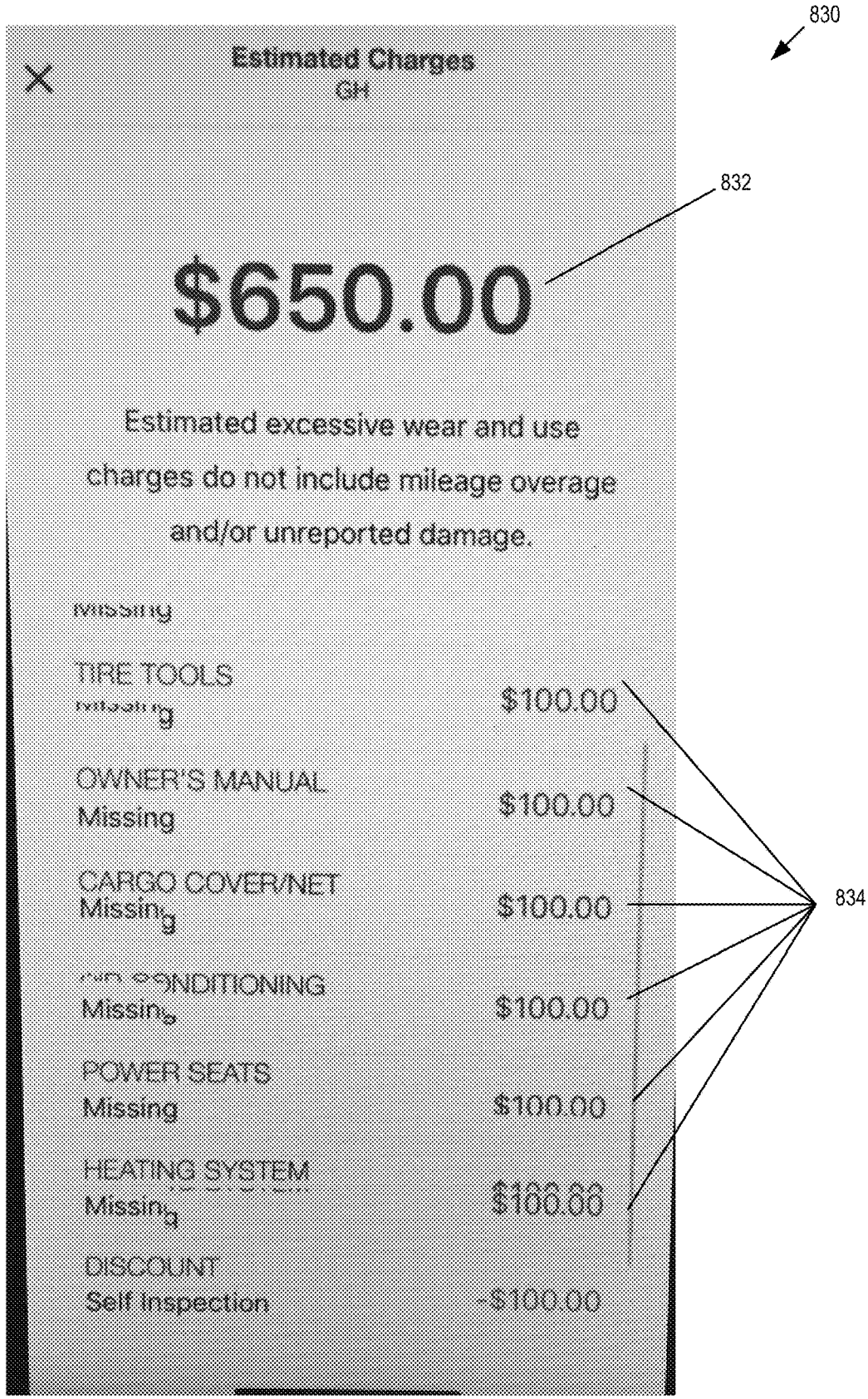
Figure 8H:
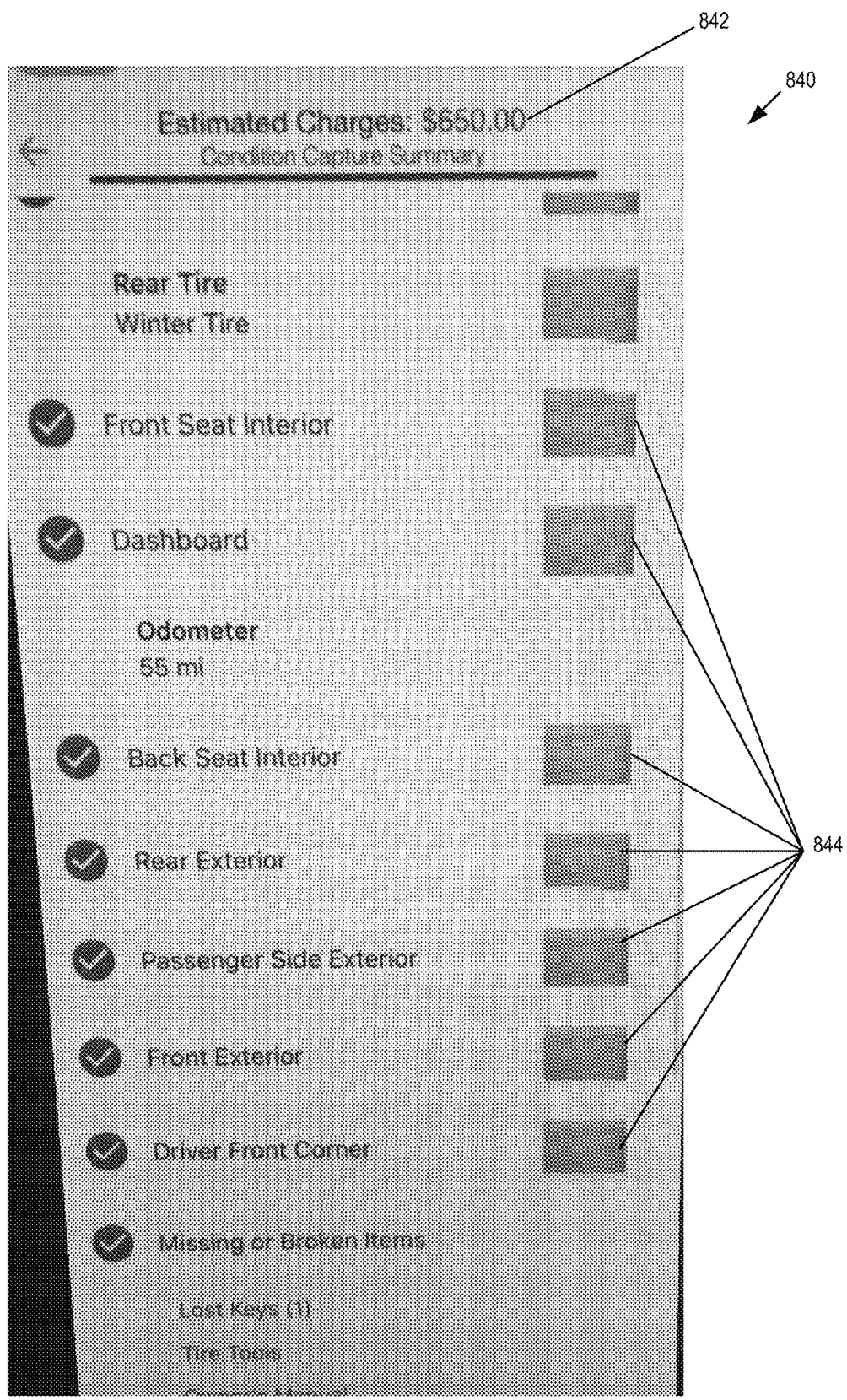
Figure 8I:
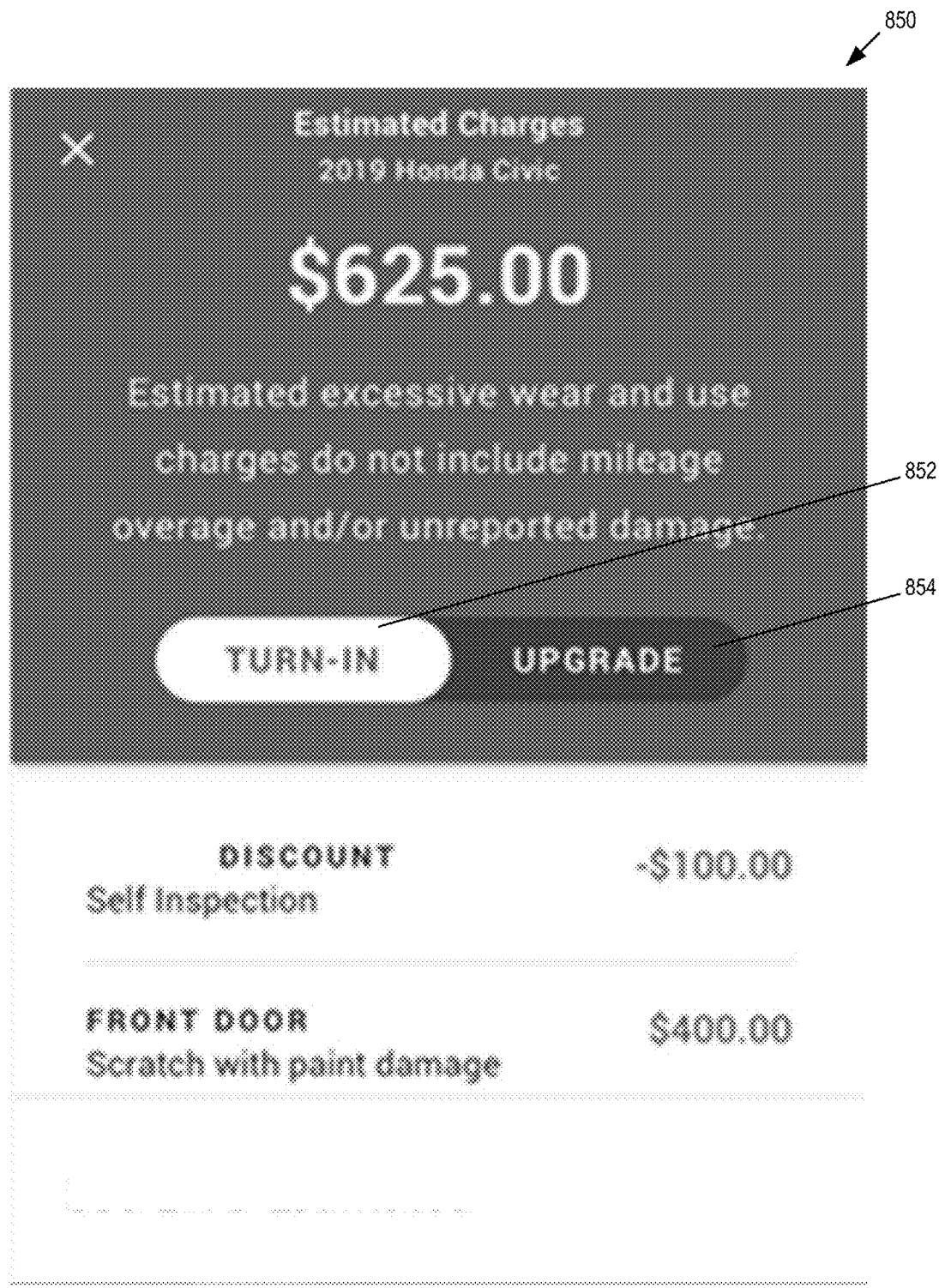
Figure 8J:
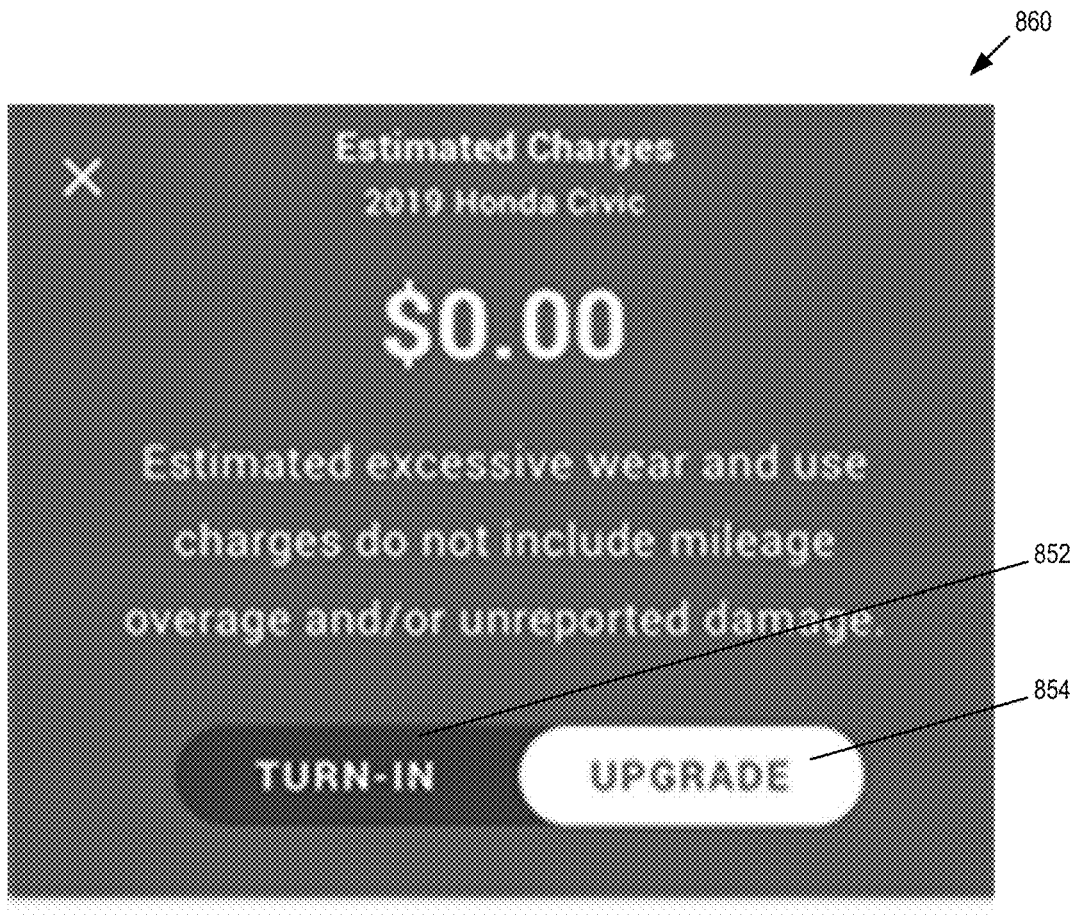

FIGS. 8A-J illustrate various graphical user interfaces (GUIs) for the self-inspection app. In particular, FIG. 8A illustrates a GUI 800 of obtaining a predetermined view of the vehicle, such as the driver side view. As shown, an outline 802 may be superimposed on the screen in order to assist the user in taking the image. Alternatively, the image of the predetermined view may be obtained automatically.

FIG. 8B illustrates a GUI 804 of inputting damage information. As shown, the user is prompted to provide input, such as by tapping the screen to indicate damage. After which, the user may be prompted to input additional information, such as a type of damage and/or additional photos highlighting the damage. FIG. 8C illustrates a GUI 806 of the optional additional information associated with the damage. FIG. 8D illustrates a GUI 808 that includes a total damage amount (identified as estimated charges 810). As discussed above, the user (such as the lessee and/or the dealer) may review an itemized list. FIG. 8E illustrates a GUI 812 of the itemized list. As shown, a total estimated charge 814 is $300, with the itemized list including a credit for performing the self-inspection (816), the charge for the scratch on the front driver door (818) and a total amount of the estimated charges (820). FIG. 8F illustrates a GUI 822 that includes the estimated charges (as a running total) 824 and missing or broken items 826. Responsive to the user inputting an indication of missing or broken items 826, the cost engine may update the total amount of the estimated charge, which is illustrated in the GUI 830 in FIG. 8G, which includes the estimated charges 832 and entries 834 for the estimated charges. FIG. 8H illustrates a GUI 840 of the estimated charges 842 and thumbnails of images 844 correlated to the different predetermined views (which may have been generated by iterating for the different predetermined views). In the event that damage was associated with one of the predetermined views, the indication of the damage and/or an additional image (e.g., a close-up image of the damage) may be correlated to the predetermined view. FIGS. 8I-J illustrate GUI 850, 860 indicating the different modes including turn-in 852 (illustrated in FIG. 8I) and upgrade 854 (illustrated in FIG. 8J). In particular, FIG. 8I illustrates the charges for a turn-in and FIG. 8J illustrates the charges for an upgrade. As shown, the cost engine may include different rules based on whether the vehicle is subject to a turn-in or subject to an upgrade.

Figure 9A:
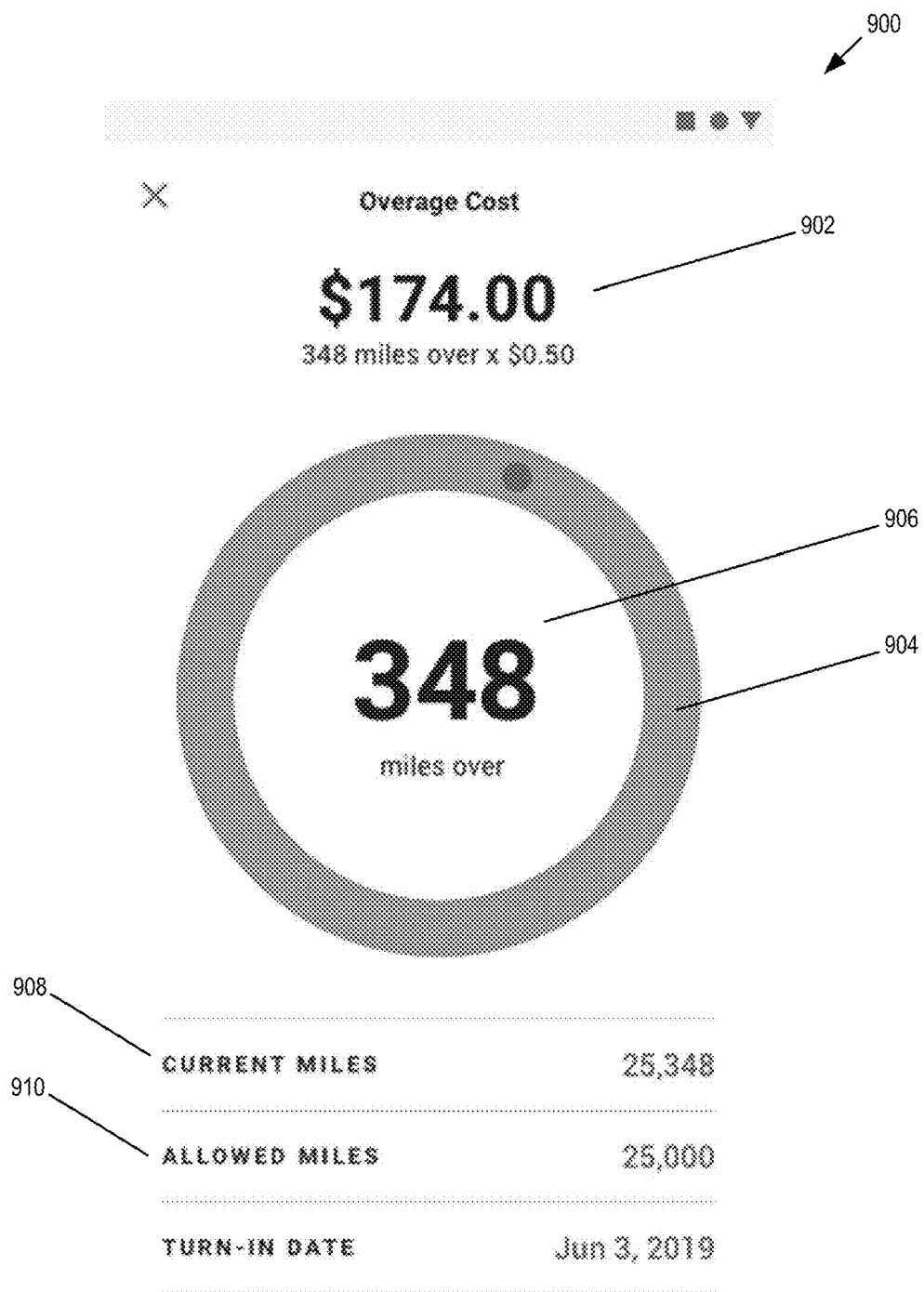
FIGS. 9A-B illustrate GUIs for the self-inspection app regarding potential overage cost due to mileage of a leased vehicle.
Figure 9B:
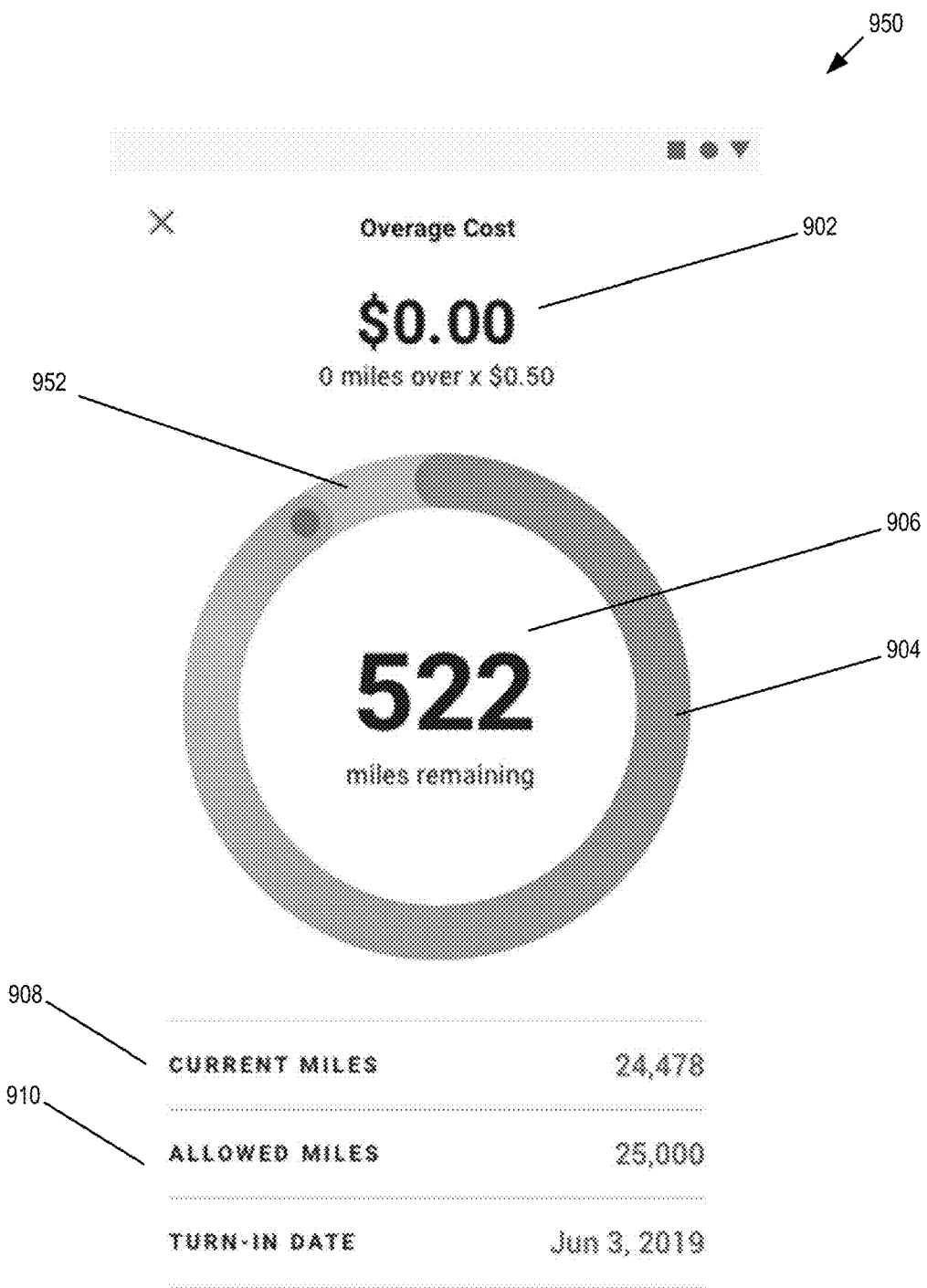

FIGS. 9A-B illustrate GUIs 900, 950 for the self-inspection app regarding potential overage cost due to mileage of a leased vehicle. For example, FIG. 9A illustrates a GUI 900 in which the lessee has exceeded the allowed number of miles in the lease, with the current miles 908 and the allowed miles 910, shown. Based on the determination, an overage cost is determined and displayed at 902. Further, a graphic may be included in GUI 900, which includes the number of miles over (906) and a graphical element 904 whose shape and/or color may provide an indication of the status whether the lessee has or has not exceeded the allowed miles 910. As shown in FIG. 9A, the lessee has exceeded the allowed miles, resulting in the graphical element 904 being a completed circle and of a darker color (such as red). In contrast, as shown in the GUI 950 in FIG. 9B, the lessee has not exceeded the allowed miles, resulting in the graphical element 904 not being a completed circle (with a gap 952) and of a lighter color (such as yellow, orange, and/or green).

Figure 10:
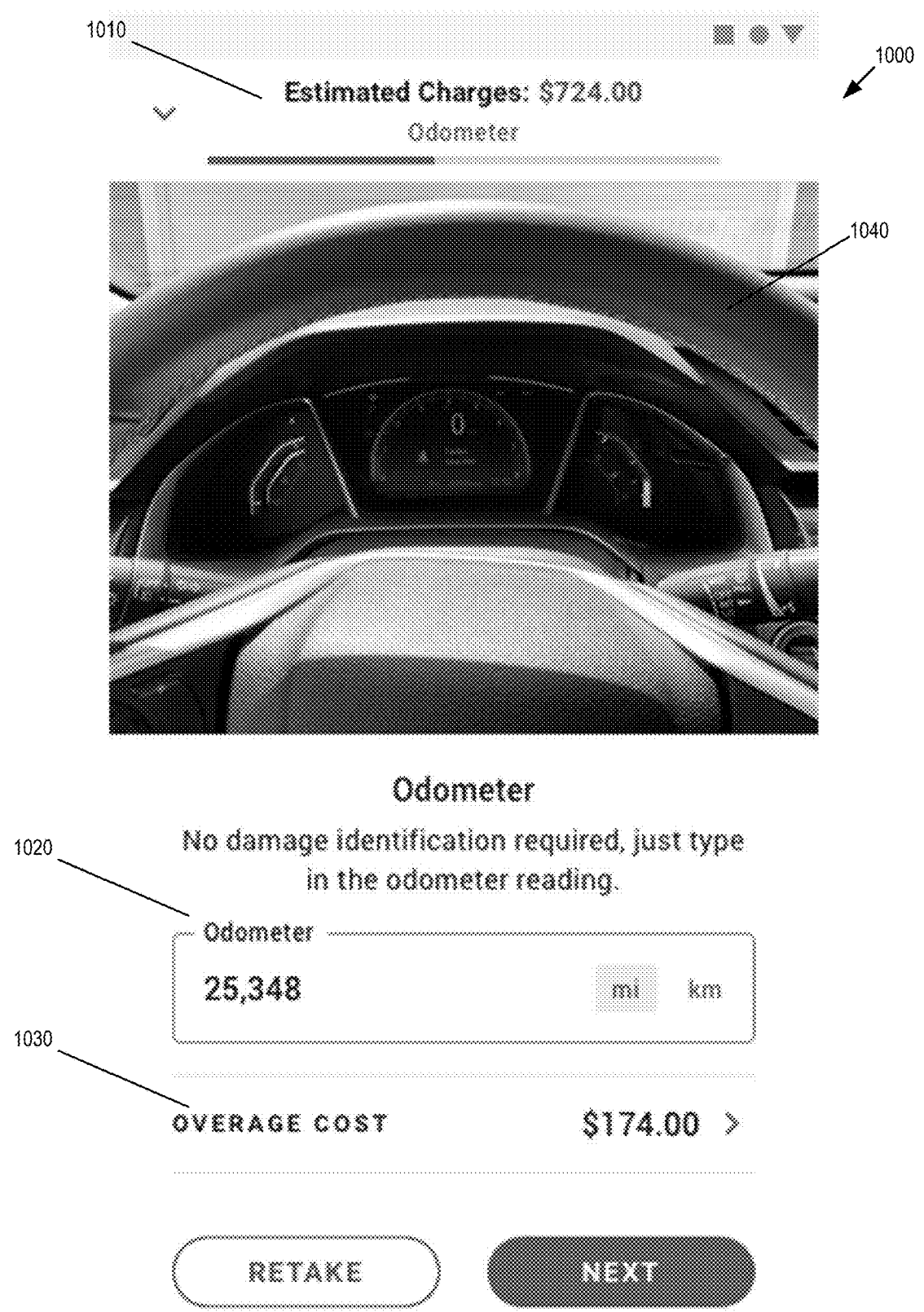
FIG. 10 illustrates another GUI for the self-inspection app regarding potential overage cost due to mileage of the leased vehicle.

FIG. 10 illustrates another GUI 1000 for the self-inspection app regarding potential overage cost due to mileage of the leased vehicle. As shown in FIG. 10, the estimated charges 1010 may be listed, with an associated image 1040 of the dashboard that includes the odometer, the odometer reading 1020 and the overage cost 1030. In this regard, FIG. 10 shows another example GUI for illustrating to the lessee the charges for exceeding the allowed mile allotment.

Figure 11:
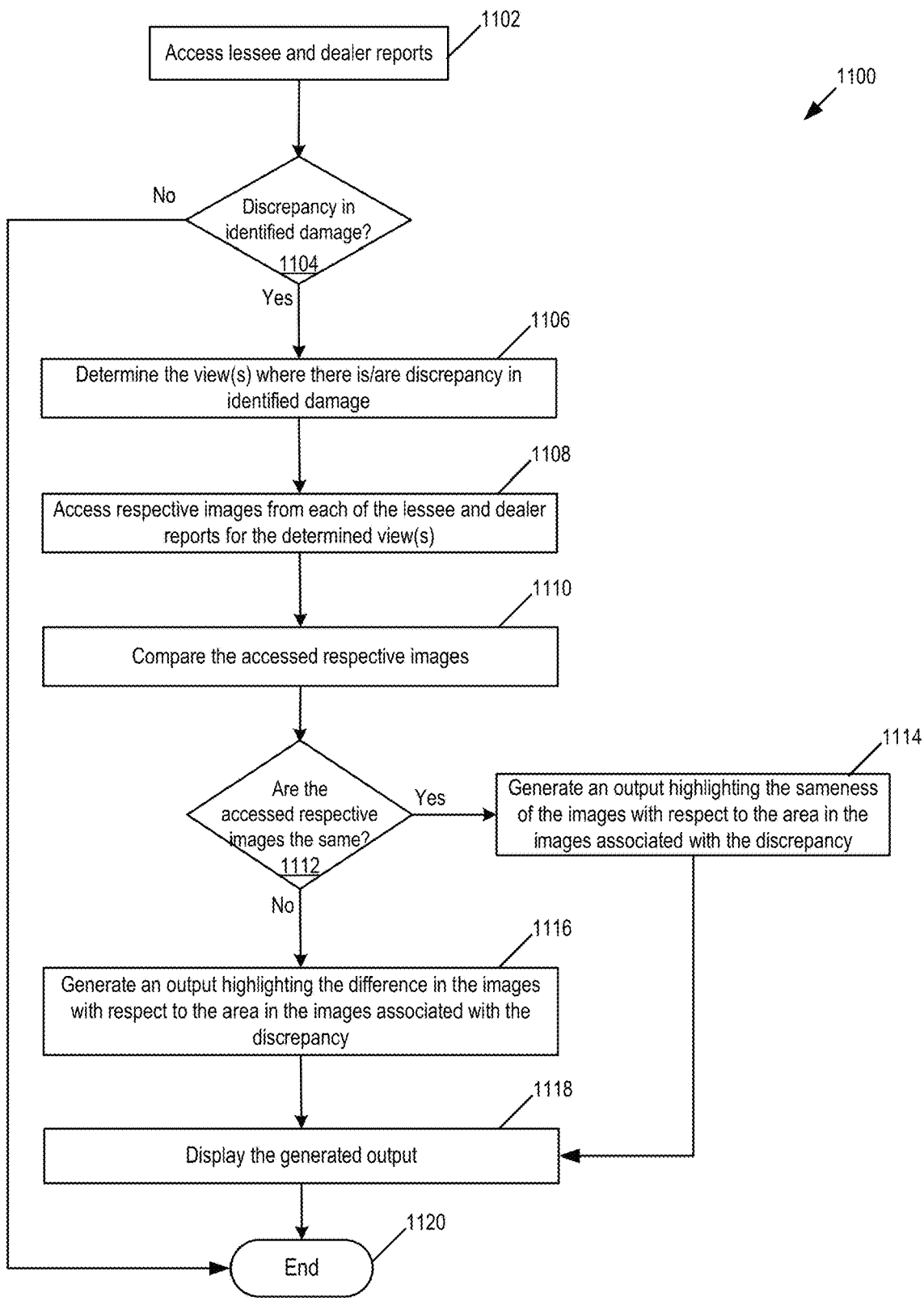
FIG. 11 illustrates a flow diagram of logic to determine whether there are discrepancies in the self-inspections performed by the lessee and the dealer and analyzing the discrepancies.

FIG. 11 illustrates a flow diagram 1100 of logic to determine whether there are discrepancies in the self-inspections performed by the lessee and the dealer, and analyzing the discrepancies. As discussed above, multiple self-inspection reports may be generated, such as from the lessee and the lessor (e.g., dealer). In the event that the damages indicated in the multiple self-inspection reports differ, the system, such as one or both of the mobile app or the back-end server, may reconcile the differences.

At 1102, the system may access both of the lessee and the dealer reports. At 1104, the system determines whether there are one or more discrepancies in identified damage in the accessed lessee and the dealer reports. If not, flow diagram 1100 ends at 1120. If so, at 1106, the system determines the one or more views where there is or are a discrepancy in the identified damage. As one example, there may be only one discrepancy in one view of the vehicle. As another example, there may be a single discrepancy in each of two views of the vehicle. As still another example, there may be multiple discrepancies in a single view of the vehicle. Regardless, one or both of the images from the view(s) subject to a discrepancy or multiple discrepancies may be analyzed. The analysis may comprise a comparison of an image from the lessee damage report and an image from the dealer damage report. Alternatively, image analysis may be performed on a single image, such as an image from the lessee damage report.

Referring back to FIG. 11, at 1108, respective images from both of the lessee and dealer damage reports may be accessed for the views subject to discrepancies. At 1110, the accessed respective images may be compared. As one example, the section of the image from the dealer damage report, which the dealer indicated included the damage that was not found in the lessee damage report, may be compared with the comparable section of the image from the lessee damage report to determine at 1112 whether the sections are the same or different. If the sections are the same, at 1114, an output may be generated highlighting the sameness of the images in both of the lessee damage report and the dealer damage report. Alternatively, if the images are different (e.g., the reported damage is a scratch to the fender: the section of the image in the dealer damage report includes the scratch to the fender whereas the section of the image in the lessee damage report does not include the scratch to the fender), at 1116, an output may be generated highlighting the difference(s) in the images in one or both of the lessee damage report and the dealer damage report, with the display of the generated output at 1118.

Still alternatively, only image(s) from one report, such as the lessee damage report, may be analyzed. For example, responsive to determining that a specific predetermined view from the lessor damage report indicates a damage item in a section of the specific predetermined view (e.g., a back view from the lessor damage report indicates a scratch on the back fender), the image of the specific predetermined view in the lessee damage report may be analyzed in order to determine whether the damage item is present in the portion of the image from the lessee damage report associated with the section of the predetermined view (e.g., analyze the portion of the image of the back view from the lessee damage report that is associated with the fender in order to determine whether there is a scratch indicated in that portion of the image).

Highlighting may be performed in one of several ways including one or both of zooming in on the section of the images subject to damage or superimposing an overlay on the images (e.g., superimposing a rectangle on the image framing the area of damage in one or both of the images in the lessee damage report or in the dealer damage report). As one example, the highlighting of the sameness or the difference(s) may frame both of the images in the lessee damage report and in the dealer damage report. Further, separate from or in addition to the highlighting, the user may receive an indication of the analysis. For example, when comparing the images from both the lessee damage report and the lessor damage report, the indication of the analysis may comprise whether the images (or portions of the images associated with the section of the damage discrepancy) are the same or different. As another example, when analyzing only image(s) from the lessee damage report, the indication of the analysis may comprise whether the image(s) from the lessee damage report (or portions of the images from the lessee damage report associated with the section of the damage discrepancy) indicate or do not indicate that the damage item is present.

Figure 12:
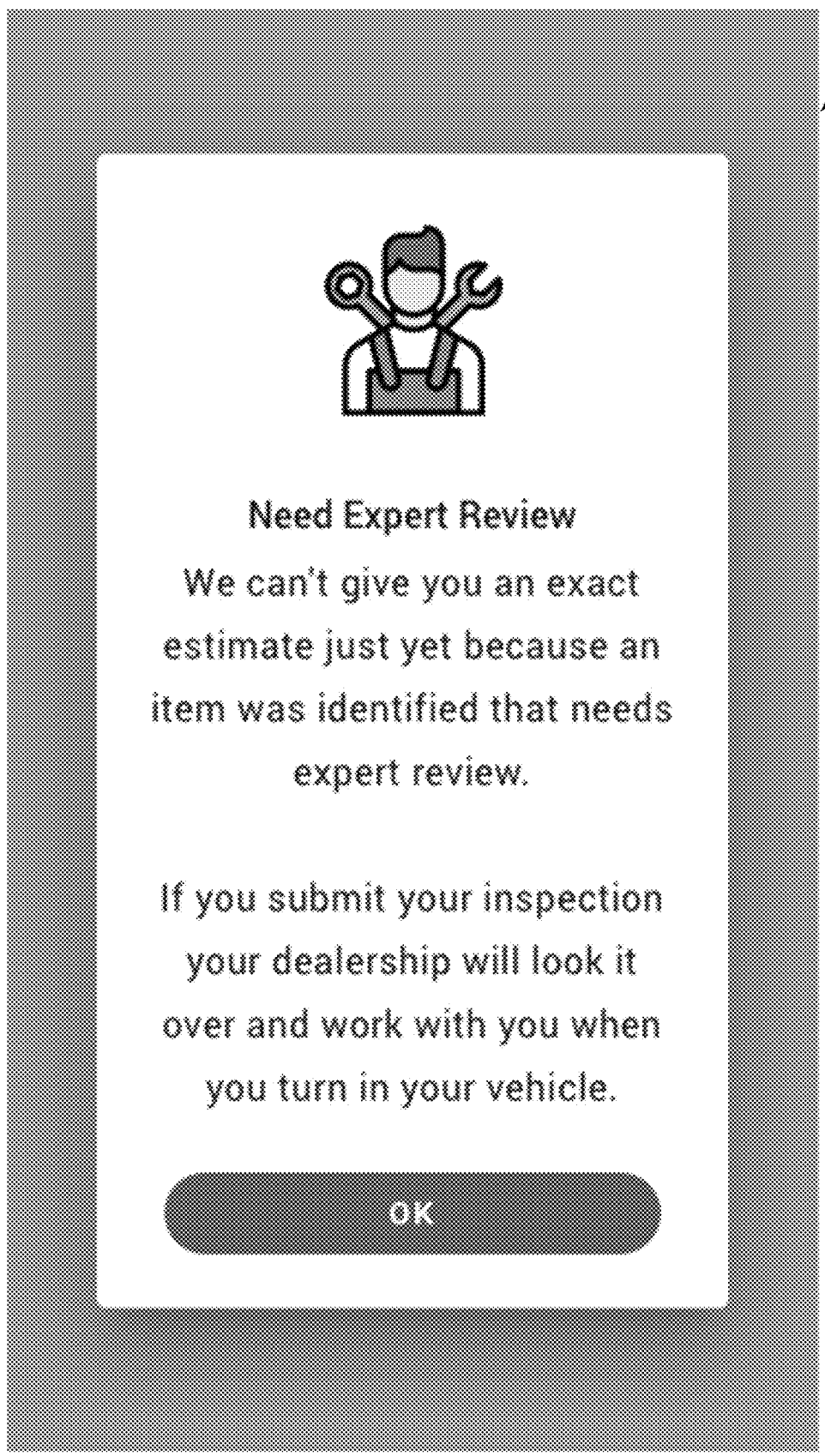
FIG. 12 is a GUI for the self-inspection app informing the user that an expert inspection is recommended.

FIG. 12 is a GUI 1200 for the self-inspection app informing the user that an expert inspection is recommended. As discussed above, damage information, such as the item damaged, may be input. In certain instances, the item and/or severity of the damage may necessitate an inspection conducted by an expert (as opposed to the lessee). Thus, the mobile app or the backend server may review the damage information input to determine, based on predetermined rules, whether the self-inspection should be halted and the user (such as the lessee) be informed via GUI 1200 that a more formal inspection should be conducted in order to generate the estimate.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:
1. At least one mobile device comprising:
at least one camera configured to generate images;
at least one display;
at least one memory; and at least one processor in communication with the at least one camera, the at least one display, and the at least one memory, the at least one processor configured to:

for a first damage report, iterate for each of a plurality of predetermined views of a vehicle by obtaining images generated by the at least one camera in order to identify an image for a respective predetermined view, wherein the first damage report is indicative of inputting damage regarding the vehicle at a first time; and for a second damage report, iterate for each of the plurality of predetermined views of the vehicle by obtaining the image generated by the at least one camera in order to identify the image for the respective predetermined view, wherein the second damage report is indicative of inputting the damage regarding the vehicle at a second time, the second time being later chronologically than the first time;

output one or more discrepancies between the first damage report and the second damage report in order to solicit input from a person viewing the output, wherein the output of the one or more discrepancies is based on an analysis of the first damage report and the second damage report in order to identify the one or more discrepancies between the first damage report and the second damage report in at least one specific predetermined view; and responsive to the output, receive the input, from the person, regarding the one or more discrepancies between the first damage report and the second damage report; and wherein the output comprises a modification of the image of the at least one specific predetermined view from one or both of the first damage report or the second damage report in order to highlight the analysis to the person viewing the modification of the image of the one or more discrepancies in the at least one specific predetermined view;

wherein the modification comprises at least one of automatic zooming in or on the one or more discrepancies or modifying a portion of the image, wherein the portion of the image to modify is selected based on a position of the one or more discrepancies within the image in order to highlight the analysis of the one or more discrepancies; and wherein at least one of:
the input is indicative of feedback from the person regarding the one or more discrepancies or indicative of at least one action performed by the person; or the output comprises modification of the images of the at least one specific predetermined view from both of the first damage report and the second damage report in order to highlight the analysis to the person viewing the modification of the images of the one or more discrepancies in the at least one specific predetermined view; and the portion of the images to modify is selected based on the position of the one or more discrepancies within the images in order to highlight the analysis of the one or more discrepancies.

2. The at least one mobile device of claim 1, wherein a single mobile device is configured to:
obtain the images for the first damage report;
obtain the images for the second damage report; and
output the one or more discrepancies.

3. The at least one mobile device of claim 1, wherein a first mobile device is configured to obtain the images for the first damage report; and wherein a second mobile device is configured to obtain the images for the first second damage report.

4. The at least one mobile device of claim 1, wherein the modification of the image comprises superimposing an overlay on the portion of the images from the first damage report and the second damage report that includes the one or more discrepancies.

5. A method for identifying images for a plurality of predetermined views of a vehicle and for identifying one or more discrepancies between a first damage report and a second damage report, the method comprising:

for a first damage report, iterating for each of a plurality of predetermined views of a vehicle to identify an image generated by at least one camera for a respective predetermined view, wherein the first damage report is indicative of inputting damage regarding the vehicle at a first time;

for a second damage report, iterating for each of the plurality of predetermined views of the vehicle to identify the image generated by the at least one camera for the respective predetermined view, wherein the second damage report being indicative of inputting the damage regarding the vehicle at a second time, the second time being later chronologically than the first time;

determining, for at least one predetermined view and based on analysis of the first damage report and the second damage report, one or more discrepancies between the image for the at least one predetermined view in the first damage report and the image for the at least one predetermined view in the second damage report;

modifying at least one image for the at least one predetermined view in the first damage report or the image of the at least one predetermined view in the second damage report in order to highlight the one or more discrepancies in the at least one images for the at least one predetermined view;

outputting on a display the image for the at least one predetermined view that is modified in order to solicit input from a person viewing the output; and responsive to the output, receiving the input, from the person, regarding the one or more discrepancies between the first damage report and the second damage report;

wherein the at least one image that is modified comprises at least one of zooming in or on the one or more discrepancies or modifying a portion of the at least one image, wherein the portion of the at least one image to modify is selected based on a position of the one or more discrepancies within the at least one image in order to highlight the analysis to the person viewing the modification of the at least one image of the one or more discrepancies; and wherein at least one of:
the input is indicative of feedback from the person regarding the one or more discrepancies or indicative of at least one action performed by the person; or the output comprises modification of the images of the at least one specific predetermined view from both of the first damage report and the second damage report in order to highlight the analysis to the person viewing the modification of the images of the one or more discrepancies in the at least one specific predetermined view; and the portion of the images to modify is selected based on the position of the one or more discrepancies within the images in order to highlight the analysis of the one or more discrepancies.

6. The method of claim 5, wherein modifying the at least one image comprises modifying the images for the at least one predetermined view in the first damage report and in the second damage report by superimposing an overlay on the portion of the images that includes the one or more discrepancies for the at least one predetermined view in the first damage report and in the second damage report.

7. The method of claim 6, wherein a single mobile device:
uses the at least one camera resident on the single mobile device to generate the images for the first damage report;
uses the at least one camera resident on the single mobile device to generate the images for the second damage report; and
uses a display resident on the single mobile device to output the images from the first damage report and second damage report in order to highlight to the person viewing the display of the one or more discrepancies.

8. The method of claim 7, wherein the single mobile device generates the images for the first damage report when beginning use of the vehicle; and
wherein the single mobile device generates the images for the second damage report when ending use of the vehicle.

9. The method of claim 8, wherein the vehicle is a rental vehicle;
wherein beginning the use of the vehicle is when the person picks up the rental vehicle from a rental vehicle company; and
wherein ending the use of the vehicle is when the person drops off the rental vehicle at the rental vehicle company.

10. The method of claim 5, wherein the modified at least one image comprises both zooming in or on the one or more discrepancies in the at least one image and modifying the portion of the at least one image based on the position of the one or more discrepancies in the at least one image in order to highlight the one or more discrepancies.

11. The at least one mobile device of claim 1, wherein the one or more discrepancies between the first damage report and the second damage report are indicative of damage to the vehicle; and
wherein the input from the person viewing the output comprises agreement or disagreement regarding the one or more discrepancies.

12. The at least one mobile device of claim 11, wherein the input from the person viewing the output comprises one or both of: agreement or disagreement with the first damage report; or agreement or disagreement with the second damage report.

13. The at least one mobile device of claim 1, wherein the input from the person viewing the output is indicative of additional inspection.

14. The at least one mobile device of claim 1, wherein the output comprises modification of the images of the at least one specific predetermined view from both of the first damage report and the second damage report in order to highlight the analysis to the person viewing the modification of the images of the one or more discrepancies in the at least one specific predetermined view; and
wherein the portion of the images to modify is selected based on the position of the one or more discrepancies within the images in order to highlight the analysis of the one or more discrepancies.

15. The at least one mobile device of claim 14, wherein the output includes both:
the modification of the images of the at least one specific predetermined view from both of the first damage report or the second damage report; and
an indication of analysis as to one or more differences in the images of the at least one specific predetermined view from both of the first damage report or the second damage report.

16. The at least one mobile device of claim 1, wherein the input from the person viewing the output is indicative of returning of the vehicle.

17. At least one mobile device of claim 1, comprising:
at least one camera configured to generate images;
at least one display;
at least one memory; and
at least one processor in communication with the at least one camera, the at least one display, and the at least one memory, the at least one processor configured to:
for a first damage report, iterate for each of a plurality of predetermined views of a vehicle by obtaining images generated by the at least one camera in order to identify an image for a respective predetermined view, wherein the first damage report is indicative of inputting damage regarding the vehicle at a first time; and
for a second damage report, iterate for each of the plurality of predetermined views of the vehicle by obtaining the image generated by the at least one camera in order to identify the image for the respective predetermined view, wherein the second damage report is indicative of inputting the damage regarding the vehicle at a second time, the second time being later chronologically than the first time;
output one or more discrepancies between the first damage report and the second damage report in order to solicit input from a person viewing the output, wherein the one or more discrepancies comprises damage, wherein the output of the one or more discrepancies is based on an analysis of the first damage report and the second damage report in order to identify the one or more discrepancies between the first damage report and the second damage report in at least one specific predetermined view; and
responsive to the output, receive the input regarding the one or more discrepancies between the first damage report and the second damage report;
determine whether the damage is chargeable to the person; and
wherein the output comprises a modification of the image of the at least one specific predetermined view from one or both of the first damage report or the second damage report in order to highlight the analysis to the person viewing the modification of the image of the one or more discrepancies in the at least one specific predetermined view; and
wherein the modification comprises at least one of automatic zooming in or on the one or more discrepancies or modifying a portion of the image, wherein the portion of the image to modify is selected based on a position of the one or more discrepancies within the image in order to highlight the analysis of the one or more discrepancies.

18. The at least one mobile device of claim 17, wherein the at least one processor is configured to determine whether the damage is chargeable to the person by determining whether the damage is greater than predetermined damage through use.

19. The method of claim 5, wherein the one or more discrepancies between the first damage report and the second damage report are indicative of damage to the vehicle; and wherein the input from the person viewing the output comprises agreement or disagreement regarding the one or more discrepancies.

20. The at least one mobile device of claim 17, wherein the at least one processor is further configured to:

output a cost for repair or replacement of the damage chargeable to the person.

21. Method of claim 5, wherein the input from the person viewing the output is indicative of additional inspection.

22. Method of claim 5, wherein the input from the person viewing the output is indicative of returning of the vehicle.

23. Method of claim 5, wherein the one or more discrepancies comprises damage; and further comprising:

determining whether the damage is chargeable to the person; and outputting a cost for repair or replacement of the damage chargeable to the person.

* * * * *